United States Patent
Siomina et al.

(10) Patent No.: US 12,028,826 B2
(45) Date of Patent: Jul. 2, 2024

(54) METHODS FOR DETECTING AND MANAGING BIDIRECTIONAL TIMING MEASUREMENTS IN NR

(71) Applicant: Telefonaktiebolaget LM Ericsson (publ), Stockholm (SE)

(72) Inventors: Iana Siomina, Täby (SE); Torbjörn Wigren, Uppsala (SE); Sholeh Yasini, Sundbyberg (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 381 days.

(21) Appl. No.: 17/422,971

(22) PCT Filed: Jan. 19, 2020

(86) PCT No.: PCT/SE2020/050046
§ 371 (c)(1),
(2) Date: Jul. 14, 2021

(87) PCT Pub. No.: WO2020/153892
PCT Pub. Date: Jul. 30, 2020

(65) Prior Publication Data
US 2022/0078745 A1    Mar. 10, 2022

Related U.S. Application Data

(60) Provisional application No. 62/794,920, filed on Jan. 21, 2019.

(51) Int. Cl.
*H04W 64/00* (2009.01)
(52) U.S. Cl.
CPC .................................. *H04W 64/00* (2013.01)

(58) Field of Classification Search
CPC ........ H04W 64/00; G01S 5/0236; G01S 5/10; G01S 5/021; H04B 7/0645; H04B 7/0695; H04B 7/0413
See application file for complete search history.

(56) References Cited

U.S. PATENT DOCUMENTS

| | | | |
|---|---|---|---|
| 11,102,693 B1 * | 8/2021 | Fang | .................... H04L 43/0864 |
| 2012/0269172 A1 * | 10/2012 | Chin | ..................... H04W 36/32 370/332 |

(Continued)

OTHER PUBLICATIONS

International Search Report and Written Opinion dated Apr. 1, 2020 for International Application No. PCT/SE2020/050046 filed Jan. 19, 2020, consisting of 19-pages.

(Continued)

*Primary Examiner* — Kabir A Timory
(74) *Attorney, Agent, or Firm* — Christopher & Weisberg, P.A.

(57) ABSTRACT

Embodiments include methods for managing a bidirectional measurement for an uplink/downlink pair of links between one or more first nodes and one or more second nodes in a wireless network. Methods include obtaining a transmit timing of a first signal on a first link of the pair during a first time resource, obtaining a receive timing of a second signal on a second link of the pair during a second time resource, and determining the bidirectional measurement based on the obtained transmit timing and obtained receive timing. In this arrangement, at least one of the following applies: the first and second links are between one first node and two respective second nodes; at least one of the first link and the second link are associated with a non-serving carrier frequency; and at least one of the first link and the second link are managed via one or more beams.

18 Claims, 11 Drawing Sheets

(56) References Cited

U.S. PATENT DOCUMENTS

2015/0189610 A1  7/2015  Siomina et al.
2020/0137715 A1* 4/2020  Edge ................... H04L 43/0864

OTHER PUBLICATIONS

3GPP TSG-RAN WG1 Meeting AH1901 R1-1900916; Title: RAT-dependent DL and UL NR positioning techniques; Agenda Item: 7.2.10.1.3; Source: Qualcomm Incorporated; Document for: Discussion and Decision; Date and Location: Jan. 21-25, 2019, Taipei, Taiwan, consisting of 7-pages.
3GPP TSG RAN WG1 Meeting AH-1901 R1-1901184; Title: Discussion on NR-TRR positioning schemes; Agenda Item: 7.2.10.1.3; Source: Fraunhofer IIS, Fraunhofer HHI; Document for: Discussion & Decision; Date and Location: Jan. 21-25, 2019, Taipei, Taiwan, consisting of 4-pages.
3GPP TS 36.213 V15.4.0; 3rd Generation Partnership Project; Technical Specification Group Radio Access Network; Evolved Universal Terrestrial Radio Access (E-UTRA); Physical layer procedures (Release 15), Dec. 2018, consisting of 550-pages.

* cited by examiner

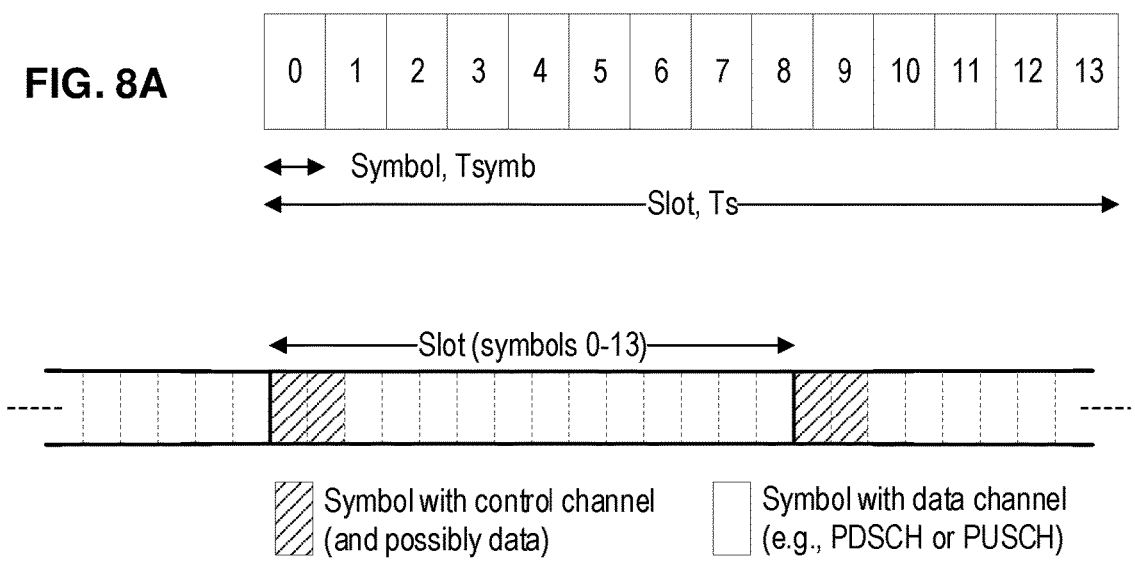
FIG. 8A
FIG. 8B
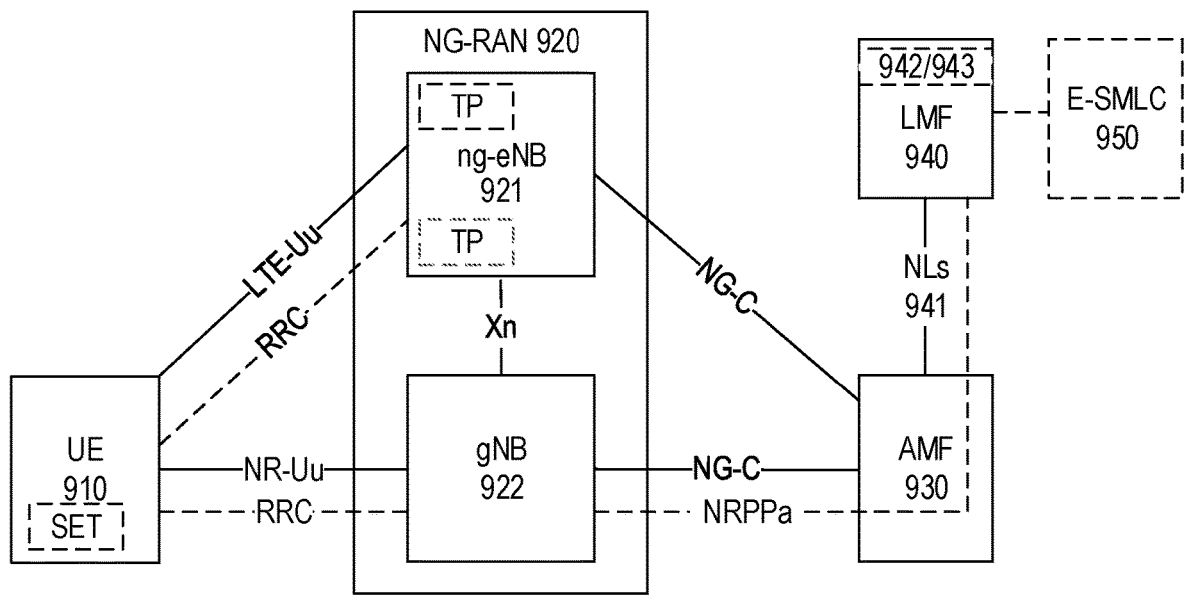
FIG. 9

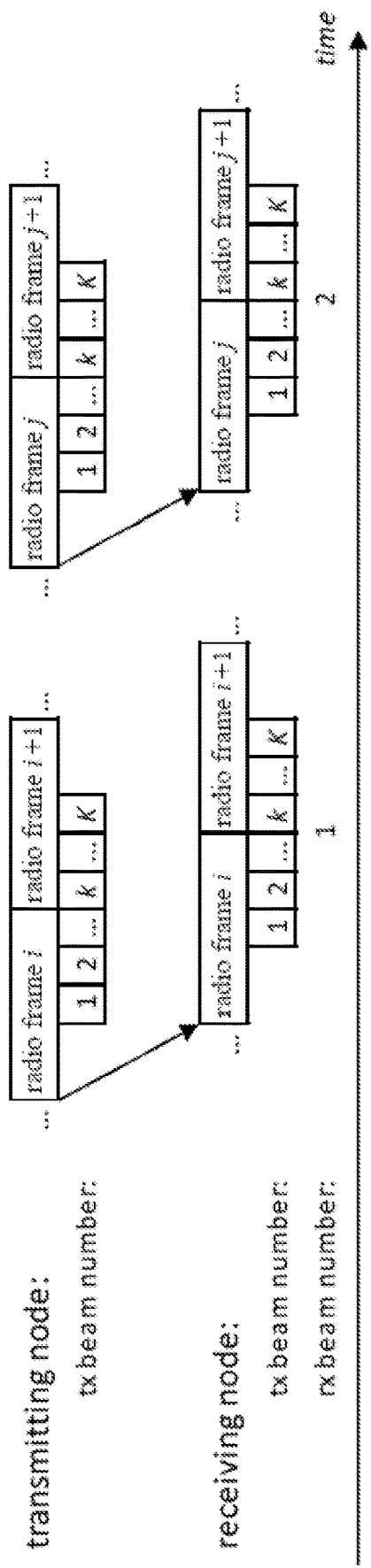
FIG. 10
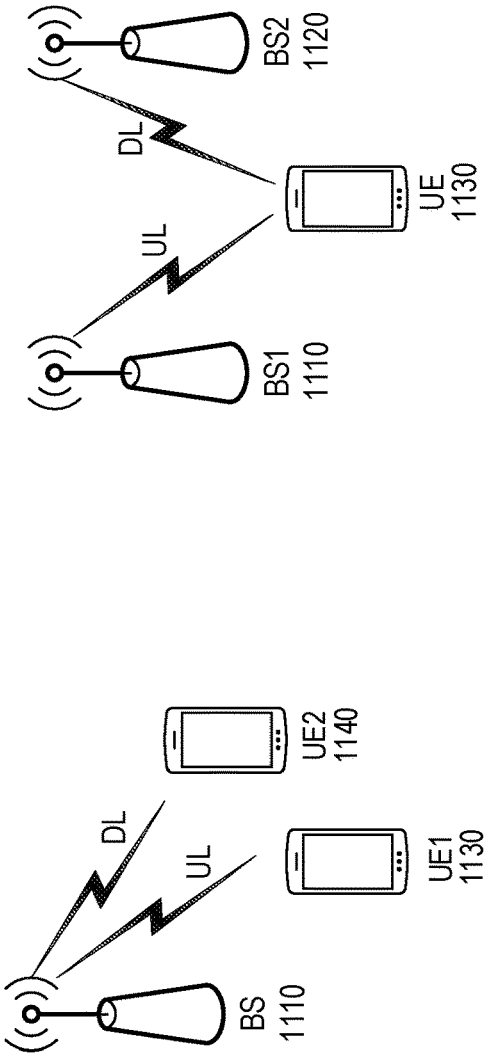
FIG. 11A
FIG. 11B

Fig. 12A

```
┌─────────────────────────────────────────────────────────────────────────┐
│ Obtaining a receive timing of a second signal on a second link of the UL/DL pair during │ 1250
│                           a second time resource.                       │
│ ┌─────────────────────────────────────────────────────────────────────┐ │
│ │  Selecting the receive timing from a plurality of receive timing measurements.  │ 1251
│ ├─────────────────────────────────────────────────────────────────────┤ │
│ │  Receiving, from another node, the receive timing and indication of one of:    │
│ │         whether compensation was applied to the receive timing;                │ 1252
│ │     an amount of compensation that was applied to the receive timing; and      │
│ │           an amount of compensation needed for the receive timing.             │
│ ├─────────────────────────────────────────────────────────────────────┤ │
│ │  Measuring the receive timing on the second signal, received from the first radio │ 1253
│ │                  network node or a second network node.                │
│ ├─────────────────────────────────────────────────────────────────────┤ │
│ │                    Transmitting the second signal.                     │ 1254
│ ├─────────────────────────────────────────────────────────────────────┤ │
│ │         Receiving a measurement of the receive timing from the second UE.      │ 1255
│ ├─────────────────────────────────────────────────────────────────────┤ │
│ │  Receiving a measurement of the receive timing from a second UE or a first radio │ 1256
│ │                              network node.                             │
│ ├─────────────────────────────────────────────────────────────────────┤ │
│ │  Receiving a measurement of the receive timing from a second UE or a second    │ 1257
│ │                         radio network node.                            │
└─────────────────────────────────────────────────────────────────────────┘
```

Determining the bidirectional measurement based on the determined transmit timing — 1260
and determined receive timing, wherein at least one of the following applies:
the first and second links are between one first node and two respective second nodes;
at least one of the first and second links are associated with a non-serving carrier frequency; and
at least one of the first and second links are managed via one or more beams.

Determining a compensation, to be applied in determining the bidirectional — 1261
  measurement, autonomously or based on information from another node.

Applying a compensation to at least one of the transmit timing, the receive — 1262
  timing, and the bidirectional measurement.

Sending the bidirectional measurement to a third node, wherein compensation is — 1270
applied before or after sending the bidirectional measurement to the third node.

Determine the position of the UE based on the compensated bidirectional — 1280
measurements.

FIG. 12B

METHODS FOR DETECTING AND MANAGING BIDIRECTIONAL TIMING MEASUREMENTS IN NR

CROSS-REFERENCE TO RELATED APPLICATIONS

This application is a Submission Under 35 U.S.C. § 371 for U.S. National Stage Patent Application of International Application No.: PCT/SE2020/050046, filed Jan. 19, 2020 entitled "METHODS FOR DETECTING AND MANAGING BIDIRECTIONAL TIMING MEASUREMENTS IN NR," which claims priority to U.S. Provisional Application No.: 62/794920, filed Jan. 21, 2019, entitled "METHODS FOR DETECTING AND MANAGING BIDIRECTIONAL TIMING MEASUREMENTS IN NR," the entireties of both of which are incorporated herein by reference.

TECHNICAL FIELD

Embodiments of the present disclosure generally relates to wireless communication networks, and particularly relates to timing measurements for devices operating in wireless communication networks (e.g., for positioning).

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods and/or procedures disclosed herein do not have to be performed in the exact order disclosed, unless a step is explicitly described as following or preceding another step and/or where it is implicit that a step must follow or precede another step. Any feature of any of the embodiments disclosed herein can be applied to any other embodiment, wherever appropriate. Likewise, any advantage of any of the embodiments can apply to any other embodiments, and vice versa. Other objectives, features and advantages of the enclosed embodiments will be apparent from the following description.

Long-Term Evolution (LTE is an umbrella term for so-called fourth-generation (4G) radio access technologies developed within the Third-Generation Partnership Project (3GPP) and initially standardized in Releases 8 and 9, also known as Evolved UTRAN (E-UTRAN). LTE is targeted at various licensed frequency bands and is accompanied by improvements to non-radio aspects commonly referred to as System Architecture Evolution (SAE), which includes Evolved Packet Core (EPC) network. LTE continues to evolve through subsequent releases that are developed according to standards-setting processes with 3GPP and its working groups (WGs), including the Radio Access Network (RAN) WG, and sub-working groups (e.g., RAN1, RAN2, etc.).

LTE Release 10 (Rel-10) supports bandwidths larger than 20 MHz. One important requirement on Rel-10 is to assure backward compatibility with LTE Release-8. As such, a wideband LTE Rel-10 carrier (e.g., wider than 20 MHz) should appear as a number of carriers to an LTE Rel-8 ("legacy") terminal. Each such carrier can be referred to as a Component Carrier (CC). For an efficient use of a wide carrier also for legacy terminals, legacy terminals can be scheduled in all parts of the wideband LTE Rel-10 carrier. One exemplary way to achieve this is by means of Carrier Aggregation (CA), whereby a Rel-10 terminal can receive multiple CCs, each preferably having the same structure as a Rel-8 carrier. One of the enhancements in LTE Rel-11 is an enhanced Physical Downlink Control Channel (ePDCCH), which has the goals of increasing capacity and improving spatial reuse of control channel resources, improving inter-cell interference coordination (ICIC), and supporting antenna beamforming and/or transmit diversity for control channel. Furthermore, LTE Rel-12 introduced dual connectivity (DC) whereby a UE can be connected to two network nodes simultaneously, thereby improving connection robustness and/or capacity.

An overall exemplary architecture of a network comprising LTE and SAE is shown in FIG. 1. E-UTRAN 100 comprises one or more evolved Node B's (eNB), such as eNBs 105, 110, and 115, and one or more user equipment (UE), such as UE 120. As used within the 3GPP standards, "user equipment" or "UE" means any wireless communication device (e.g., smartphone or computing device) that is capable of communicating with 3GPP-standard-compliant network equipment, including E-UTRAN as well as UTRAN and/or GERAN, as the third- ("3G") and second-generation ("2G") 3GPP radio access networks are commonly known.

As specified by 3GPP, E-UTRAN 100 is responsible for all radio-related functions in the network, including radio bearer control, radio admission control, radio mobility control, scheduling, and dynamic allocation of resources to UEs in uplink and downlink, as well as security of the communications with the UE. These functions reside in the eNBs, such as eNBs 105, 110, and 115. The eNBs in the E-UTRAN communicate with each other via the X1 interface, as shown in FIG. 1. The eNBs also are responsible for the E-UTRAN interface to the EPC 130, specifically the S1 interface to the Mobility Management Entity (MME) and the Serving Gateway (SGW), shown collectively as MME/S-GWs 134 and 138 in FIG. 1. Generally speaking, the MME/S-GW handles both the overall control of the UE and data flow between the UE and the rest of the EPC. More specifically, the MME processes the signaling (e.g., control plane) protocols between the UE and the EPC, which are known as the Non-Access Stratum (NAS) protocols. The S-GW handles all Internet Procotol (IP) data packets (e.g., data or user plane) between the UE and the EPC, and serves as the local mobility anchor for the data bearers when the UE moves between eNBs, such as eNBs 105, 110, and 115.

EPC 130 can also include a Home Subscriber Server (HSS) 131, which manages user- and subscriber-related information. HSS 131 can also provide support functions in mobility management, call and session setup, user authentication and access authorization. The functions of HSS 131 can be related to the functions of legacy Home Location Register (HLR) and Authentication Centre (AuC) functions or operations.

In some embodiments, HSS 131 can communicate with a user data repository (UDR)—labelled EPC-UDR 135 in FIG. 1—via a Ud interface. The EPC-UDR 135 can store user credentials after they have been encrypted by AuC algorithms. These algorithms are not standardized (i.e., vendor-specific), such that encrypted credentials stored in EPC-UDR 135 are inaccessible by any other vendor than the vendor of HSS 131.

FIG. 2A shows a high-level block diagram of an exemplary LTE architecture in terms of its constituent entities—

UE, E-UTRAN, and EPC—and high-level functional division into the Access Stratum (AS) and the Non-Access Stratum (NAS). FIG. 2A also illustrates two particular interface points, namely Uu (UE/E-UTRAN Radio Interface) and S1 (E-UTRAN/EPC interface), each using a specific set of protocols, i.e., Radio Protocols and S1 Protocols. Although not shown in FIG. 2A, each of the protocol sets can be further segmented into user plane and control plane protocol functionality. The user and control planes are also referred to as U-plane and C-plane, respectively. On the Uu interface, the U-plane carries user information (e.g., data packets) while the C-plane carries control information between UE and E-UTRAN.

FIG. 2B illustrates a block diagram of an exemplary C-plane protocol stack between a UE, an eNB, and an MME. The exemplary protocol stack includes Physical (PHY), Medium Access Control (MAC), Radio Link Control (RLC), Packet Data Convergence Protocol (PDCP), and Radio Resource Control (RRC) layers between the UE and eNB. The PHY layer is concerned with how and what characteristics are used to transfer data over transport channels on the LTE radio interface. The MAC layer provides data transfer services on logical channels, maps logical channels to PHY transport channels, and reallocates PHY resources to support these services. The RLC layer provides error detection and/or correction, concatenation, segmentation, and reassembly, reordering of data transferred to or from the upper layers. The PHY, MAC, and RLC layers perform identical functions for both the U-plane and the C-plane. The PDCP layer provides ciphering/deciphering and integrity protection for both U-plane and C-plane, as well as other functions for the U-plane such as header compression. The exemplary protocol stack also includes non-access stratum (NAS) signaling between the UE and the MME.

FIG. 2C shows a block diagram of an exemplary LTE radio interface protocol architecture from the perspective of the PHY layer. The interfaces between the various layers are provided by Service Access Points (SAPs), indicated by the ovals in FIG. 2C. The PHY layer interfaces with the MAC and RRC protocol layers described above. The PHY, MAC, and RRC are also referred to as Layers 1-3, respectively, in the figure. The MAC provides different logical channels to the RLC protocol layer (also described above), characterized by the type of information transferred, whereas the PHY provides a transport channel to the MAC, characterized by how the information is transferred over the radio interface. In providing this transport service, the PHY performs various functions including error detection and correction; rate-matching and mapping of the coded transport channel onto physical channels; power weighting, modulation, and demodulation of physical channels; transmit diversity; and beamforming multiple input multiple output (MIMO) antenna processing. The PHY layer also receives control information (e.g., commands) from RRC and provides various information to RRC, such as radio measurements.

The RRC layer controls communications between a UE and an eNB at the radio interface, as well as the mobility of a UE between cells in the E-UTRAN. After a UE is powered ON it will be in the RRC_IDLE state until an RRC connection is established with the network, at which time the UE will transition to RRC_CONNECTED state (e.g., where data transfer can occur). The UE; returns to RRC_IDLE after the connection with the network is released. In RRC_IDLE state, the UE's radio is active on a discontinuous reception (DRX) schedule configured by upper layers. During DRX active periods (also referred to as "On durations"), an RRC_IDLE UE receives system information (SI) broadcast by a serving cell, performs measurements of neighbor cells to support cell reselection, and monitors a paging channel on PDCCH for pages from the EPC via eNB. An RRC_IDLE UE is known in the EPC and has an assigned IP address, but is not known to the serving eNB (e.g., there is no stored context).

Generally speaking, a physical channel corresponds a set of resource elements carrying information that originates from higher layers. Downlink (i.e., eNB to UE) physical channels provided by the LTE PHY include Physical Downlink Shared Channel (PDSCH), Physical Multicast Channel (PMCH), Physical Downlink Control Channel (PDCCH), Relay Physical Downlink Control Channel (R-PDCCH), Physical Broadcast Channel (PBCH), Physical Control Format Indicator Channel (PCFICH), and Physical Hybrid ARQ Indicator Channel (PHICH). In addition, the LTE PHY downlink includes various reference signals, synchronization signals, and discovery signals.

PBCH carries the basic system information, required by the UE to access the network. PDSCH is the main physical channel used for unicast DL data transmission, but also for transmission of RAR (random access response), certain system information blocks, and paging information. PHICH carries HARQ feedback (e.g., ACK/NAK) for UL transmissions by the UEs. Similarly, PDCCH carries DL scheduling assignments (e.g., for PDSCH), UL resource grants (e.g., for PUSCH), channel quality feedback (e.g., CSI) for the UL channel, and other control information.

Uplink (i.e., UE to eNB) physical channels provided by the LTE PHY include Physical Uplink Shared Channel (PUSCH), Physical Uplink Control Channel (PUCCH), and Physical Random Access Channel (PRACH). In addition, the LTE PHY uplink includes various reference signals including demodulation reference signals (DM-RS), which are transmitted to aid the eNB in the reception of an associated PUCCH or PUSCH; and sounding reference signals (SRS), which are not associated with any uplink channel.

PRACH is used for random access preamble transmission. PUSCH is the counterpart of PDSCH, used primarily for unicast UL data transmission. Similar to PDCCH, PUCCH carries uplink control information (UCI) such as scheduling requests, CSI for the DL channel, HARQ feedback for eNB DL transmissions, and other control information.

The multiple access scheme for the LTE PHY is based on Orthogonal Frequency Division Multiplexing (OFDM) with a cyclic prefix (CP) in the downlink, and on Single-Carrier Frequency Division Multiple Access (SC-FDMA) with a cyclic prefix in the uplink. To support transmission in paired and unpaired spectrum, the LTE PHY supports both Frequency Division Duplexing (FDD) (including both full- and half-duplex operation) and Time Division Duplexing (TDD). FIG. 3A shows an exemplary radio frame structure ("type 1") used for LTE FDD downlink (DL) operation. The DL radio frame has a fixed duration of 10 ms and consists of 20 slots, labeled 0 through 19, each with a fixed duration of 0.5 ms. A 1-ms subframe comprises two consecutive slots where subframe i consists of slots 2i and 2i+1. Each exemplary FDD DL slot consists of $N^{DL}_{symb}$ OFDM symbols, each of which is comprised of $N_s$, OFDM subcarriers. Exemplary values of $N^{DL}_{symb}$ can be 7 (with a normal CP) or 6 (with an extended-length CP) for subcarrier spacing (SCS) of 15 kHz. The value of $N_{sc}$ is configurable based upon the available channel bandwidth. Since persons of ordinary skill in the art are familiar with the principles of OFDM, further details are omitted in this description.

As shown in FIG. 3A, a combination of a particular subcarrier in a particular symbol is known as a resource element (RE). Each RE is used to transmit a particular number of bits, depending on the type of modulation and/or bit-mapping constellation used for that RE. For example, some REs may carry two bits using QPSK modulation, while other REs may carry four or six bits using 16- or 64-QAM, respectively. The radio resources of the LTE PHY are also defined in terms of physical resource blocks (PRBs). A PRB spans $N^{RB}_{sc}$ sub-carriers over the duration of a slot (i.e., $N^{DL}_{symb}$ Symbols), where $N^{RB}_{sc}$ is typically either 12 (with a 15-kHz sub-carrier bandwidth) or 24 (7.5-kHz bandwidth). A PRB spanning the same $N^{RB}_{sc}$ subcarriers during an entire subframe (i.e., $2N^{DL}_{symb}$ symbols) is known as a PRB pair. Accordingly, the resources available in a subframe of the LTE PHY DL comprise $N^{DL}_{RB}$ PRB pairs, each of which comprises $2N^{DL}_{symb} \cdot N^{RB}_{sc}$ REs. For a normal CP and 15-KHz SCS, a PRB pair comprises 168 REs.

One exemplary characteristic of PRBs is that consecutively numbered PRBs (e.g., $PRB_i$ and $PRB_{i+1}$) comprise consecutive blocks of subcarriers. For example, with a normal CP and 15-KHz sub-carrier bandwidth (or "sub-carrier spacing", SCS), $PRB_0$ comprises sub-carriers 0 through 11 while $PRB_1$ comprises sub-carriers 12 through 23. The LTE PHY resource also can be defined in terms of virtual resource blocks (VRBs), which are the same size as PRBs but may be of either a localized or a distributed type. Localized VRBs can be mapped directly to PRBs such that VRB $n_{VRB}$ corresponds to PRB $n_{PRB}=n_{VRB}$. On the other hand, distributed VRBs may be mapped to non-consecutive PRBs according to various rules, as described in 3GPP Technical Specification (TS) 36.213 or otherwise known to persons of ordinary skill in the art. However, the term "PRB" shall be used in this disclosure to refer to both physical and virtual resource blocks. Moreover, the term "PRB" will be used henceforth to refer to a resource block for the duration of a subframe, i.e., a PRB pair, unless otherwise specified.

FIG. 3B shows an exemplary LTE FDD uplink (UL) radio frame configured in a similar manner as the exemplary FDD DL radio frame shown in FIG. 3A. Using terminology consistent with the above DL description, each UL slot consists of $N^{UL}_{symb}$ OFDM symbols, each of which is comprised of $N_{sc}$ OFDM subcarriers.

As discussed above, the LTE PHY maps the various DL and UL physical channels to the resources shown in FIGS. 3A and 3B, respectively. Both PDCCH and PUCCH can be transmitted on aggregations of one or several consecutive control channel elements (CCEs), and a CCE is mapped to the physical resource based on resource element groups (REGs), each of which is comprised of a plurality of REs. For example, a CCE can comprise nine (9) REGs, each of which can comprise four (4) REs.

The REGs comprising the CCEs of the PDCCH can be mapped into the first three symbols of a subframe, referred to as a "control region," whereas the remaining symbols are available for other physical channels, such as the PDSCH which carries user data. The number of CCEs may vary depending on the required PDCCH capacity, which can be determined based on number of users, amount of measurements and/or control signaling, etc. On the uplink, PUCCH can be configured similarly. In general, the control region includes the first n OFDM symbols (n=1-4) in each subframe. The value n is known as the Control Format Indicator (CFI) and is indicated by the PCFICH transmitted in the first symbol of the control region.

LTE UL and DL transmissions are dynamically scheduled, in each subframe, by the eNB transmitting various scheduling DCIs on PDCCH (i.e., in the control region). Each scheduling DCI indicates which UE is scheduled to receive or transmit data, and in which resource blocks of the current subframe that the data should be received or transmitted.

Within the LTE DL, certain REs within each LTE subframe are reserved for the transmission of reference signals, such as DM-RS mentioned above. Other DL reference signals include cell-specific reference signals (CRS), positioning reference signals (PRS), and CSI reference signals (CSI-RS). UL reference signals include DM-RS as well as sounding reference signals (SRS). Other RS-like DL signals include Primary Synchronization Sequence (PSS) and Secondary Synchronization Sequence (SSS), which facilitate the UEs time and frequency synchronization and acquisition of system parameters (e.g., via PBCH).

3GPP LTE standards provide various ways for positioning (e.g., determining the position of, locating, and/or determining the location of) UEs operating in LTE networks. In general, an LTE positioning node (referred to as "E-SMLC" or "location server") configures the target device (e.g., UE), an eNB, or a radio network node dedicated for positioning measurements (e.g., a "location measurement unit" or "LMU") to perform one or more positioning measurements according to one or more positioning methods. For example, the positioning measurements can include timing (and/or timing difference) measurements on UE and/or network transmissions. The positioning measurements are used by the target device, the measuring node, and/or the positioning node to determine the location of the target device. In LTE, the positioning node communicates with UE using LTE positioning protocol (LPP) and with eNB using LTE positioning protocol annex (LPPa).

In 3GPP, a study item on a new radio interface for 5G has recently been completed and 3GPP has now continued with the effort to standardize this new radio interface, often abbreviated by NR (New Radio). While LTE was primarily designed for user-to-user communications, 5G/NR networks are envisioned to support both high single-user data rates (e.g., 1 Gb/s) and large-scale, machine-to-machine communication involving short, bursty transmissions from many different devices that share the frequency bandwidth.

Much like LTE, UE positioning is expected to be an important feature for NR, which may include additional UE positioning use cases, scenarios, and/or applications. However, there are significant differences between LTE and NR, such that positioning techniques used for LTE cannot be fully utilized for NR. As such, there is a need for positioning solutions that are applicable to NR, particularly for such additional use cases, scenarios, and/or applications.

SUMMARY

Embodiments of the present disclosure provide specific improvements to communication between user equipment (UE) and network nodes in a wireless communication network, such as by facilitating solutions to overcome the exemplary problems described above.

Some exemplary embodiments of the present disclosure include methods (e.g., procedures) for managing bidirectional measurements of signals on an uplink/downlink pair between one or more first nodes and one or more second nodes in a wireless network (e.g., E-UTRAN, NG-RAN). In various embodiments, these exemplary methods can be performed by various entities in a network, including UEs, radio network nodes, and location management functions (LMFs).

These exemplary methods can include obtaining a transmit timing of a first signal on a first link of the UL/DL pair during a first time resource. These exemplary methods can also include obtaining a receive timing of a second signal on a second link of the UL/DL pair during a second time resource. These exemplary methods can also include determining the bidirectional measurement based on the obtained transmit timing and obtained receive timing. Furthermore, at least one of the following conditions applies:

the first and second links are between one first node and two respective second nodes;
at least one of the first link and the second link are associated with a non-serving carrier frequency; and
at least one of the first link and the second link are managed via one or more beams. In some embodiments, the first time resource and the second time resource are different (e.g., different subframes or different radio frames).

In some embodiments, at least one of the transmit timing and receive timing can be defined with respect to a reference time resource, which is one of the following:
a pre-defined time resource,
the first time resource,
the second time resource,
a time resource of a first beam in the one or more beams, or
a time resource indicated by another node.

In some of these embodiments, where the reference time resource is the second time resource, the second signal can be a beamformed transmission from a non-serving cell associated with one of the second nodes, and the first signal can be a beamformed transmission from the first node.

In some embodiments, obtaining the transmit timing can include selecting the transmit timing from a plurality of transmit timing measurements. Alternately or in addition, obtaining the receive timing can include selecting the receive timing from a plurality of receive timing measurements.

In some embodiments, determining the bidirectional measurement can include applying a compensation to at least one of the transmit timing, the receive timing, and the bidirectional measurement. In such embodiments, the compensation can be based on one or more of the following:
a timing difference due to transmit beamforming on at least one of the first link and the second link, wherein transmissions of the first signal via different transmit beams are associated with different time resources;
a timing difference due to receive beamforming on at least one of the first and second links, wherein receiving of the second signal via different receive beams is associated with different time resources; and
a difference between respective propagation distances or propagation times of the first link and the second link.

In some embodiments, determining the bidirectional measurement can also include determining the compensation autonomously or based on information received from another node.

In some embodiments, these exemplary methods can include sending the bidirectional measurement to a third node (e.g., radio network node, positioning node etc.). In such embodiments, the compensation can be applied before or after sending the bidirectional measurement to the third node. In some cases, the bidirectional measurement can be sent to the third node together with an indication of one of the following:
whether compensation was applied to the bidirectional measurement;
an amount of compensation that was applied to the bidirectional measurement; and
an amount of compensation needed for the bidirectional measurement.

In some embodiments, obtaining the transmit timing can include receiving, from another node in the wireless network, the transmit timing and an indication of one of the following:
whether compensation was applied to the transmit timing,
an amount of compensation that was applied to the transmit timing, or
an amount of compensation needed for the transmit timing.

Alternately or in addition, obtaining the receive timing can include receiving, from another node in the wireless network, the receive timing and an indication of one of the following:
whether compensation was applied to the receive timing,
an amount of compensation that was applied to the receive timing, or
an amount of compensation needed for the receive timing.

In some embodiments, these exemplary methods can also include determining a position of a user equipment (UE) based on the bidirectional measurement.

In some embodiments, the exemplary methods can be performed by a UE. In such embodiments, obtaining the transmit timing can include receiving, from a first radio network node, a message controlling the transmit timing of the first signal; and obtaining the transmit timing of the first signal based on the message. Furthermore, in such embodiments, these exemplary methods can also include transmitting the first signal based on the obtained transmit timing. Additionally, obtaining the receive timing can include measuring the receive timing on the second signal, wherein the second signal is received from the first radio network node or a second network node.

In some of these embodiments, the first link is an UL between the UE and a first radio network node, wherein the first radio network node is a serving node for the UE. In addition, the second link is DL between a second radio network node and the UE, wherein the second radio network node is a non-serving node for the UE and the second signal is received from the second radio network node.

In other of these embodiments, the first and second time resources are different subframes or different radio frames. In such case, the second signal is received, from the first radio network node, during the second time resource using a second beam, while the first signal is transmitted during the first time resource using one or more first beams that are different from the second beam.

Some of the UE-performed embodiments include receiving, from the wireless network, a configuration including one or more of the following:
identification of at least one of the first time resource and the second time resource;
beamforming configuration associated with transmission of the first signal;
transmit timing advance for the first signal;
power control for transmission of the first signal;
transmission resources or timing pattern associated with the first signal;

beamforming configuration associated with the second signal;

transmission or reception resources or transmission or reception timing pattern associated with the second signal;

difference between the respective propagation distances of the first link and the second link; and indication of whether compensation should be applied to one or more of the transmit timing and the receive timing.

In some of these embodiments, these exemplary methods can also include transmitting an indication that the UE supports a bidirectional measurement on an asymmetric UL/DL pair between the UE and two radio network nodes. In such case, the configuration can be received in response to the transmitted indication.

In other embodiments, the first and second links are between the first node and the two respective second nodes. In such case, the first link is an UL between a first UE and a first radio network node, and the second link is DL between the first radio network node and a second UE.

In some of these embodiments, the method can be performed by the first radio network node or by a positioning node in the wireless network (e.g., LMU). In such embodiments, obtaining the transmit timing can include measuring the transmit timing on the first signal, received from the first UE. In addition, obtaining the receive timing can include transmitting the second signal and receiving a measurement of the receive timing from the second UE.

In other of these embodiments, the method can be performed by a location management function (LMF) coupled to the wireless network. In such embodiments, obtaining the transmit timing can include receiving a measurement of the transmit timing from a first radio network node. In addition, obtaining the receive timing can include receiving a measurement of the receive timing from the second UE or the first radio network node.

In yet other embodiments, the method can be performed by an LMF coupled to the wireless network. In such embodiments, obtaining the transmit timing can include receiving a measurement of the transmit timing from a first UE or a first radio network node. In addition, obtaining the receive timing can include receiving a measurement of the receive timing from a second UE or a second radio network node.

Other exemplary embodiments include user equipment (UEs, e.g., wireless devices, IoT devices, or components thereof, such as a modem), radio network nodes (e.g., radio base station(s), eNBs, gNBs, CU/DU, TRPs, controllers, etc.), and location management functions (LMFs) configured to perform operations corresponding to various exemplary methods described herein. Other exemplary embodiments include non-transitory, computer-readable media storing program instructions that, when executed by processing circuitry, configure such UEs, radio network nodes, or LMFs to perform operations corresponding to various exemplary methods described herein.

These and other objects, features and advantages of embodiments of the present disclosure will become apparent upon reading the following Detailed Description in view of the Drawings briefly described below.

BRIEF DESCRIPTION OF THE DRAWINGS

FIGS. 8A-8B shows various exemplary NR slot configurations.

FIG. 9 shows an exemplary positioning architecture within an NR network.

FIG. 10 shows an exemplary multi-beam transmission over multiple radio frames, according to various exemplary embodiments of the present disclosure.

FIG. 11, which includes FIGS. 11A and 11B, illustrates two exemplary bidirectional measurements with asymmetric links, according to various exemplary embodiments of the present disclosure.

FIG. 12, which includes FIGS. 12A and 12B, shows a flow diagram of an exemplary method (e.g., procedure) for managing a bidirectional measurement for an uplink/downlink (UL/DL) pair of links in a wireless network, according to various exemplary embodiments of the present disclosure.

DETAILED DESCRIPTION

Figure 1:
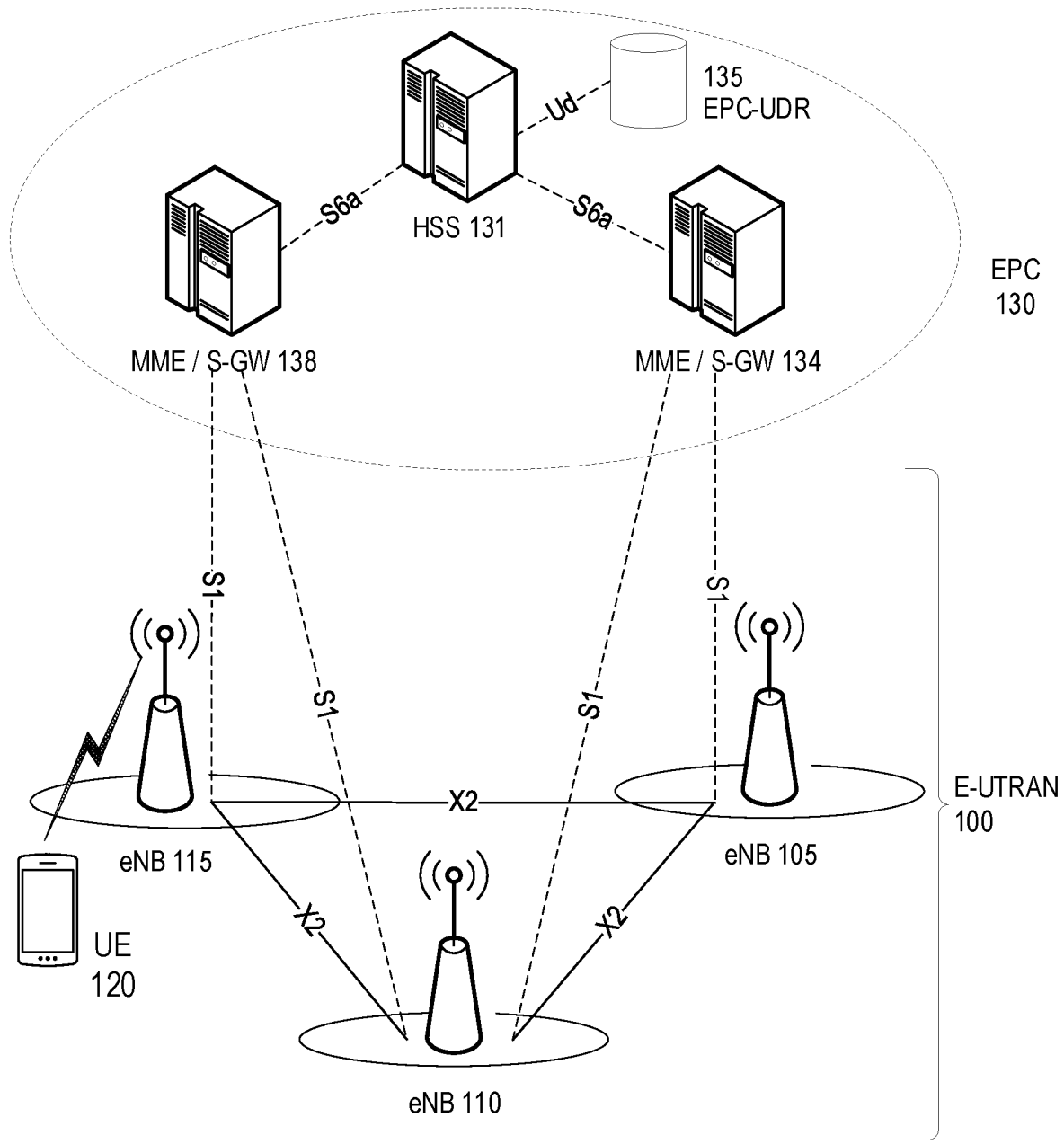
FIG. 1 is a high-level block diagram of an exemplary architecture of the Long-Term Evolution (LTE) Evolved UTRAN (E-UTRAN) and Evolved Packet Core (EPC) network, as standardized by 3GPP.
Figure 2A:
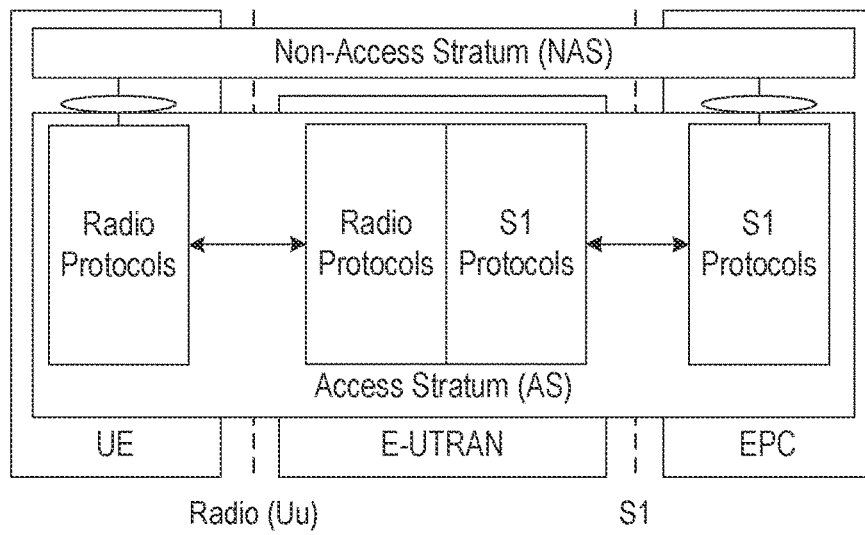
FIG. 2A is a high-level block diagram of an exemplary E-UTRAN architecture in terms of its constituent components, protocols, and interfaces.
Figure 2B:
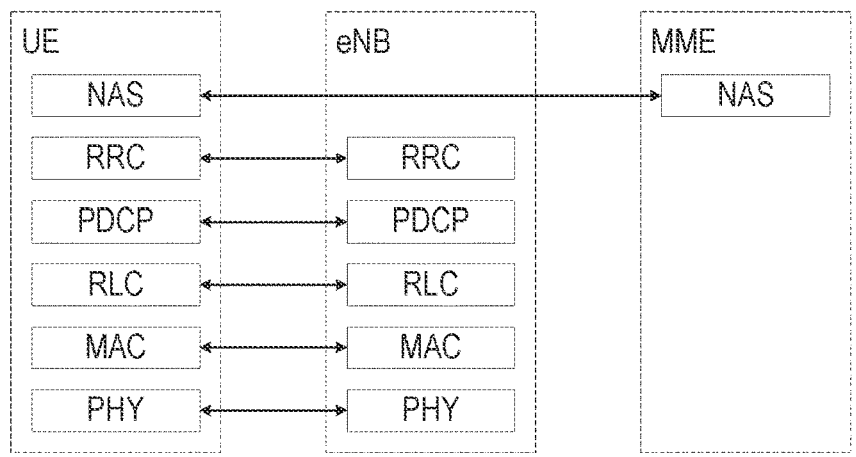
FIG. 2B is a block diagram of exemplary protocol layers of the control-plane portion of the radio (Uu) interface between a user equipment (UE) and the E-UTRAN.
Figure 2C:
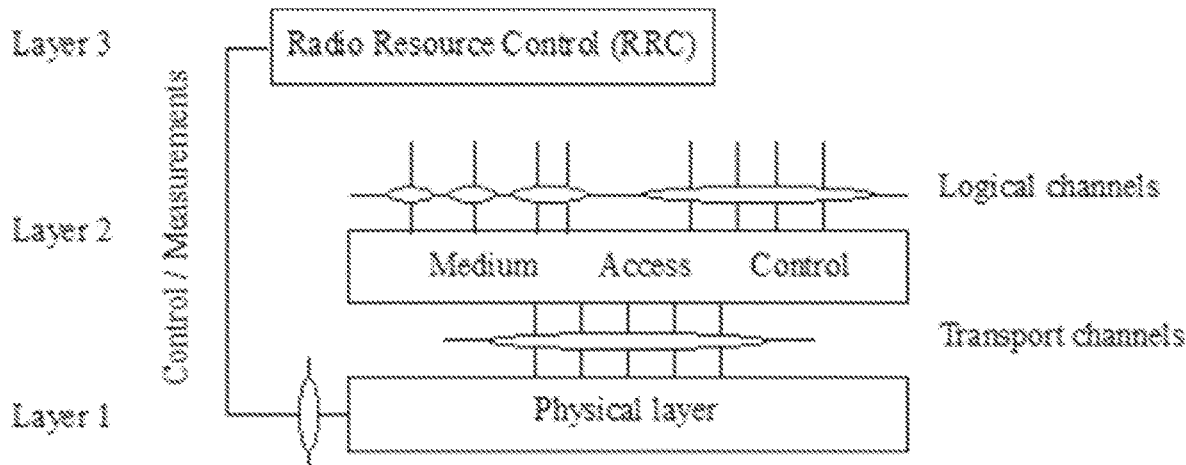
FIG. 2C is a block diagram of an exemplary LTE radio interface protocol architecture from the perspective of the PHY layer.
Figure 3A:
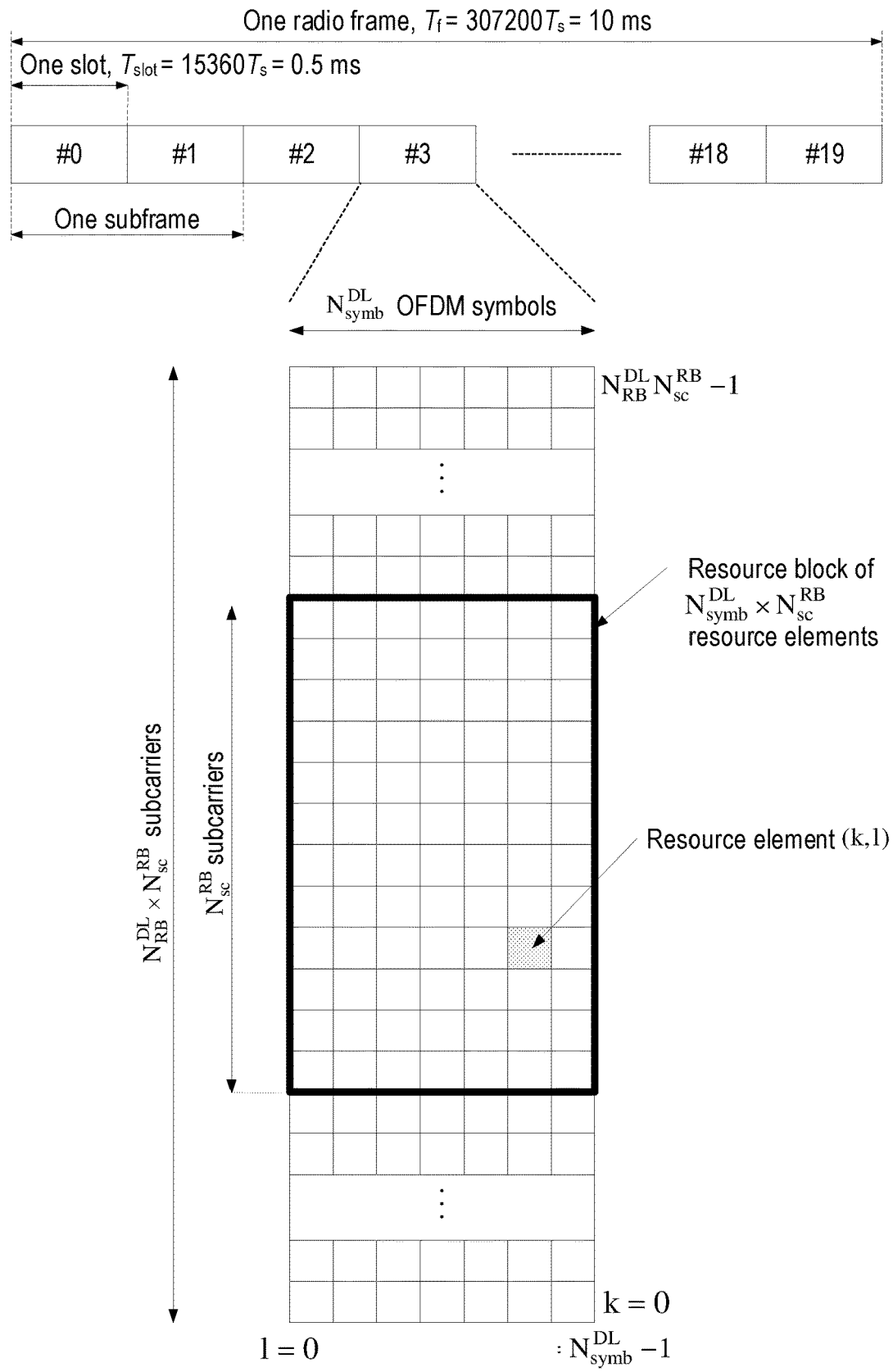
FIGS. 3A and 3B are block diagrams, respectively, of exemplary downlink and uplink LTE radio frame structures used for frequency division duplexing (FDD) operation.
Figure 3B:
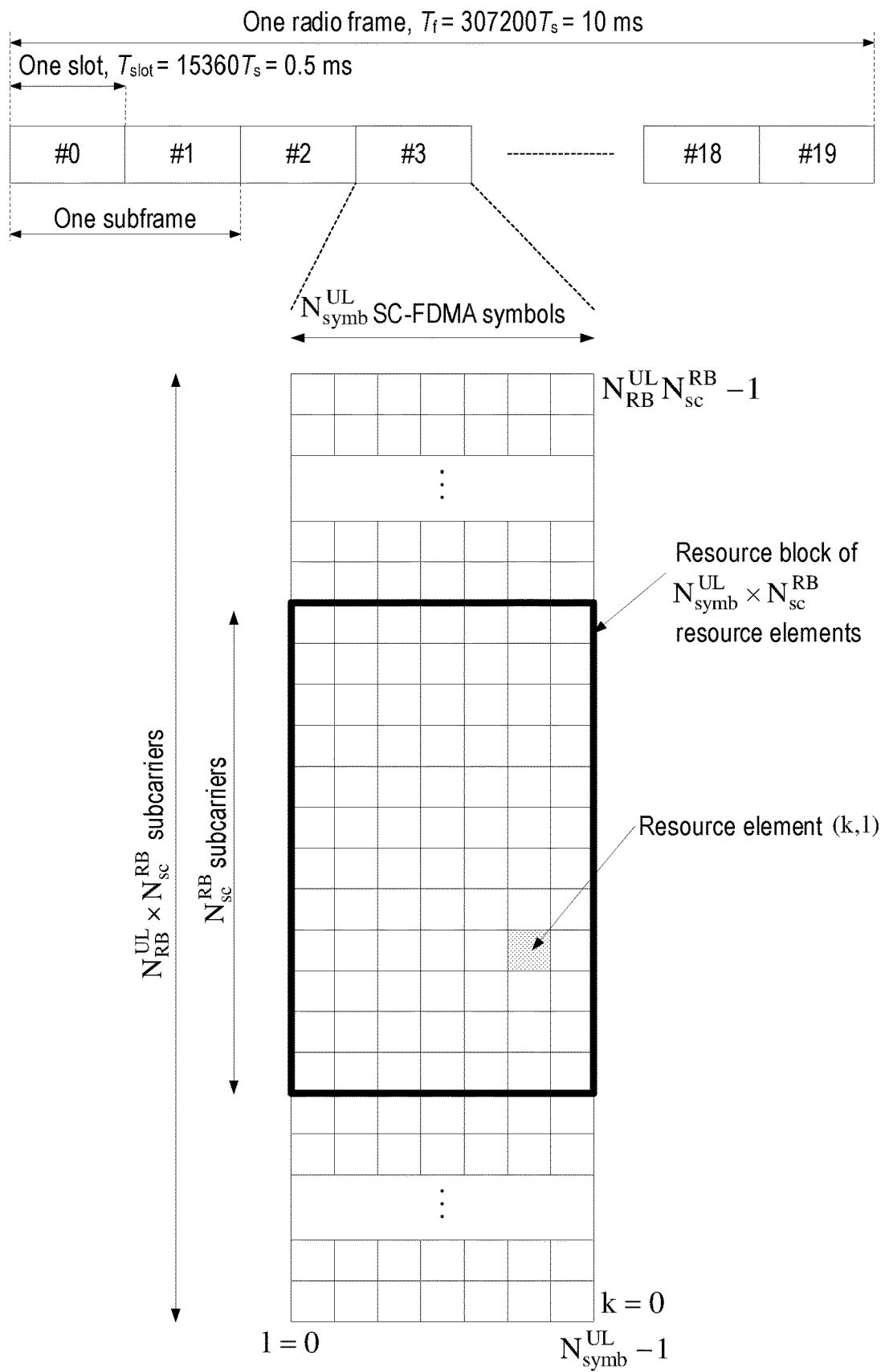

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art. Furthermore, various terms discussed below will be used throughout the application.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, donor node controlling relay, radio access point (AP), transmission point (TP), transmission/reception point (TRP), transmission nodes, Remote Radio Unit (RRU), Remote Radio Head (RRH), core network node (e.g., MME, SGW), core network function (e.g., AMF, LMF, etc.), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. A network node may also comprise test equipment.

The term "radio network node" can refer to any type of "network node" a radio access network (RAN) that operates to wirelessly transmit and/or receive signals. Radio network nodes can include any type of base station, radio base station, base transceiver station, base station controller, network controller, RNC, evolved Node B (eNB), Node B, gNB, Multi-cell/multicast Coordination Entity (MCE), relay node, access point, radio access point, Remote Radio Unit (RRU) Remote Radio Head (RRH). In addition, a location measurement unit (LMU), or equivalent positioning measurement node and/or functionality, is a type of radio network node.

In some embodiments, a TRP may be associated with a network node or radio network node. In some embodiments, a multi-TRP scenario may include more than one TRPs associated with one or more network nodes.

Unless otherwise noted, the terms "wireless device" (or "WD" for short) and "user equipment" (or "UE" for short) are used interchangeably. A WD can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, a Narrowband IoT (NB-IOT) device, ProSe UE, V2V UE, V2X UE, etc.

The embodiments described herein are not limited to MTC UEs but can apply for any UE supporting short measurements gaps and measurement gaps for dense positioning reference signals (PRS) or other dense signals for a specific type of radio measurements (e.g., positioning measurements).

The term "radio node" (or simply "node") used herein may be used to also denote a wireless device (WD) such as a wireless device (WD) or a radio network node.

Note that although terminology from one particular wireless system (e.g., LTE and/or NR) may be used herein, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Unless otherwise noted, functions described herein as being performed by a WD, UE, network node, radio network node, etc. can be distributed over a plurality of devices and/or network nodes. In other words, it is contemplated that the functions of the network node and WD described herein are not limited to performance by a single physical device and, in fact, can be distributed among several physical devices.

Unless otherwise noted, the term "time resource" can correspond to any type of physical resource or radio resource expressed in terms of length of time or time interval or time duration. In some embodiments, the term "slot" is used to indicate a radio resource; however, it should be understood that the techniques described herein may advantageously be used with other types of radio resources, such as any type of physical resource or radio resource expressed in terms of length of time. Examples of time resources include symbol, time slot, minislot, subframe, radio frame, transmission time interval (TTI), interleaving time, a time resource number, etc.

Unless otherwise noted, the term "TTI" can correspond to any time period over which a physical channel can be encoded and interleaved for transmission (e.g., during the TTI). The physical channel can be decoded by the receiver over the same time period (T0) over which it was encoded. The TTI may also interchangeably called as short TTI (sTTI), transmission time, slot, sub-slot, mini-slot, short subframe (SSF), mini-subframe etc.

In some embodiments, a transmitter (e.g., network node) and a receiver (e.g., WD) can have a common, predetermined understanding about rule(s) for determining which resources to be arranged for transmission and/or reception of one or more physical channels. Such rules may, in some embodiments, be referred to as "mapping." In other embodiments, the term "mapping" may have other meanings.

Unless otherwise noted, the term "channel" can refer to a logical, transport, or physical channel. A channel may comprise and/or be arranged on one or more carriers, e.g., a plurality of subcarriers. A channel carrying and/or for carrying control signaling/control information may be considered a control channel, in particular if it is a physical layer channel and/or if it carries control plane information. Analogously, a channel carrying—and/or for carrying—data signaling/user information may be considered a data channel (e.g., PDSCH), in particular if it is a physical layer channel and/or if it carries user plane (UP) information. A channel may be defined for a specific communication direction, or for two complementary communication directions (e.g., UL and DL, or sidelink in two directions), in which case it may be considered to have two component channels, one for each direction.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

As briefly mentioned, UE positioning is expected to be an important feature for NR, which may include additional UE positioning use cases, scenarios, and/or applications. However, there are significant differences between LTE and NR, such that positioning techniques used for LTE cannot be fully utilized for NR. As such, there is a need for positioning solutions that are applicable to NR, particularly for such additional use cases, scenarios, and/or applications. These issues are discussed in more detail below.

Figure 4:
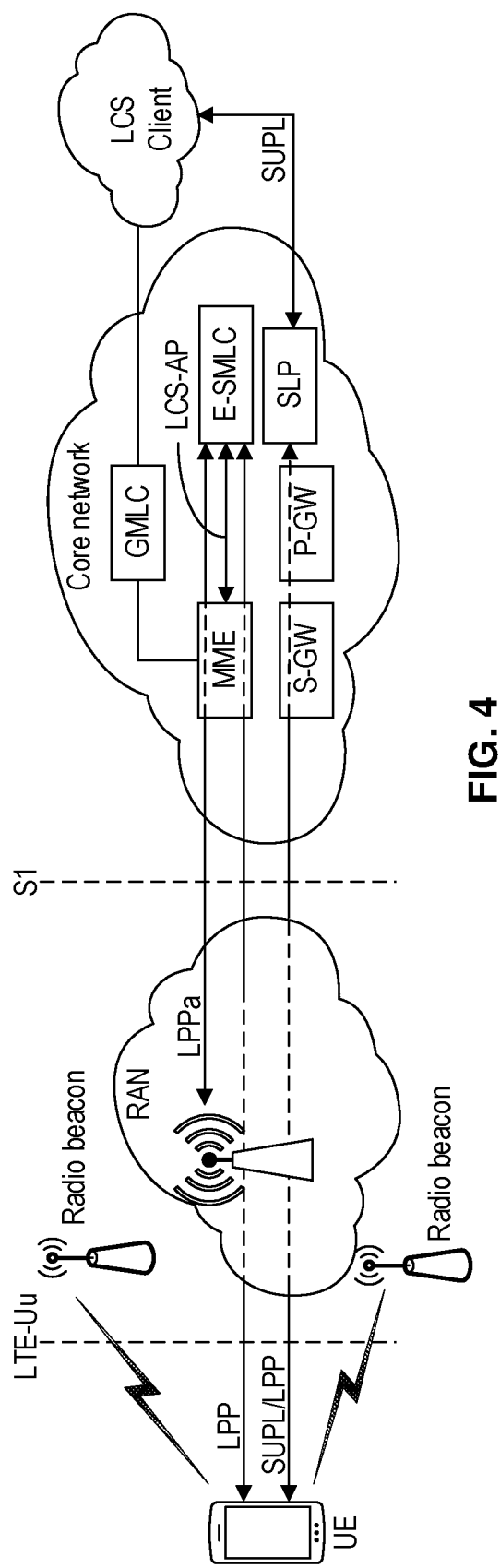
FIG. 4 shows an exemplary positioning architecture within an LTE network.

FIG. 4 shows an exemplary positioning architecture within an LTE network. Three important functional elements of the LTE positioning architecture are the LCS Client, the LCS target and the LCS Server. The LCS Server is a physical or logical entity (e.g., as embodied by the E-SMLC or SLP in FIG. 4) managing positioning for an LCS target (e.g., as embodiments by the UE in FIG. 4) by collecting measurements and other location information, assisting the terminal in measurements when necessary, and estimating the LCS target location. An LCS Client is a software and/or hardware entity that interacts with an LCS Server for the purpose of obtaining location information for one or more LCS targets (i.e., the entities being positioned) such as the UE in FIG. 4. LCS Clients may also reside in the LCS targets themselves. An LCS Client sends a request to LCS Server to obtain location information, and LCS Server processes and serves the received requests and sends the positioning result and optionally a velocity estimate to the LCS Client. A positioning request can be originated from the terminal or a network node or external client.

In the LTE architecture shown in FIG. 4, position calculation can be conducted, for example, by the LCS Server (e.g., E-SMLC or SLP) or by the LCS target (e.g., a UE). The former approach corresponds to the UE-assisted positioning mode when it is based on UE measurements, whilst the latter corresponds to the UE-based positioning mode. The following positioning methods are supported in LTE:

Enhanced Cell ID (E-CID). Utilizes information to associate the UE with the geographical area of a serving cell, and then additional information to determine a finer granularity position. The following measurements are supported for E-CID: AoA (base station only), UE Rx-Tx time difference, timing advance (TA) types 1 and 2, reference signal received power (RSRP), and reference signal received quality (RSRQ).

Assisted GNSS. GNSS information retrieved by the UE, supported by assistance information provided to the UE from the E-SMLC.

OTDOA (Observed Time Difference of Arrival). The UE receives and measures Global Navigation Satellite System (GNSS) signals, supported by assistance information provided to the UE from E-SMLC.

UTDOA (Uplink TDOA). The UE is requested to transmit a specific waveform that is detected by multiple location measurement units (LMUs, which may be standalone, co-located or integrated into an eNB) at known positions. These measurements are forwarded to the E-SMLC for multilateration.

In addition, one or more of the following positioning modes can be utilized in each of the positioning methods listed above:

UE-Assisted: The UE performs measurements with or without assistance from the network and sends these measurements to the E-SMLC where the position calculation may take place.

UE-Based: The UE performs measurements and calculates its own position with assistance from the network.

Standalone: The UE performs measurements and calculates its own position without network assistance.

Figure 5:
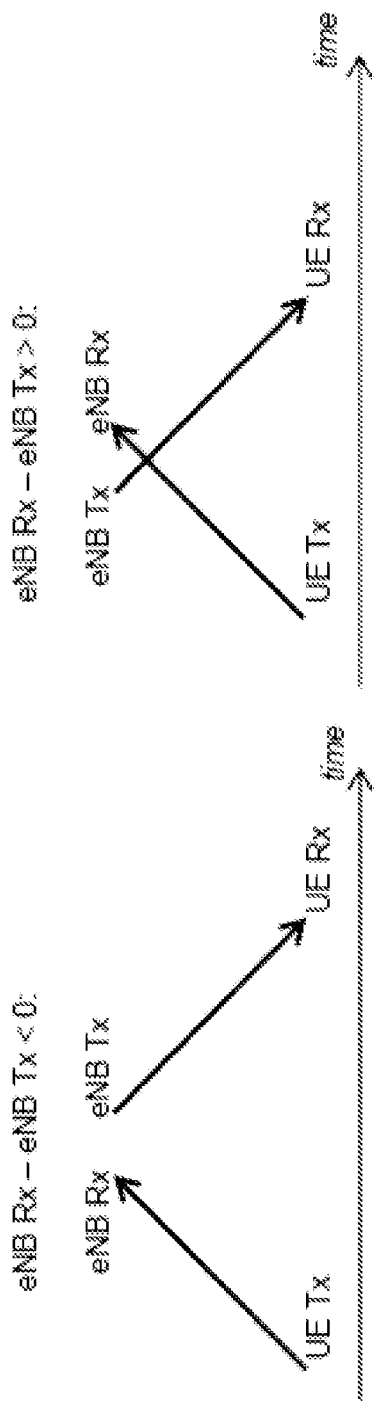
FIG. 5 shows exemplary measurements of UE receive-transmit (RX-TX) time difference and UE timing advance (TA) in an LTE network.

FIG. 5 shows exemplary timing measurements in an LTE network. As shown in FIG. 5, timing measurements used in LTE include UE Rx-Tx time difference and TA types 1 and 2. All of these can be reported for E-CID positioning; however, these measurements are limited to the UE's serving cell only. TA Type 2 measurement is the Rx-Tx (receive-transmit) timing difference (positive or negative value) of radio frame i at the eNB, and it relies on the TA estimated from receiving a PRACH preamble during the UE's random-access procedure. TA type 1 measurement is defined as the sum of the Rx-Tx timing difference of radio frame i at the eNB and the UE Rx-Tx time difference (always a positive value). The eNB first measures its own timing difference and configures the UE to correct its uplink timing by TA command via the MAC layer. The UE measures and reports UE Rx-Tx timing difference as well. Both timing differences facilitate the calculation of TA type 1, which is an estimate of the round trip time (RTT) between UE and base station. An estimate of the distance d between UE and base station can then be calculated using $d=c*RTT/2$, where c is the speed of light.

Even so, measurements of Rx-Tx time difference and TA have various limitations which impact the accuracy of E-CID positioning. For example, Rx-Tx timing measurements are limited to the UE's serving cell only, whereas the other supported positioning methods incorporate measurements from other cells and/or GNSS satellites. Furthermore, the accuracy of the RX-TX timing measurements is relatively low even for the serving cell.

While LTE was primarily designed for user-to-user communications, 5G (also referred to as "NR") cellular networks are envisioned to support both high single-user data rates (e.g., 1 Gb/s) and large-scale, machine-to-machine communication involving short, bursty transmissions from many different devices that share the frequency bandwidth. The 5G radio standards (also referred to as "New Radio" or "NR") are currently targeting a wide range of data services including eMBB (enhanced Mobile Broad Band), URLLC (Ultra-Reliable Low Latency Communication), and Machine-Type Communications (MTC). These services can have different requirements and objectives. For example, URLLC is intended to provide a data service with extremely strict error and latency requirements, e.g., error probabilities as low as $10^{-5}$ or lower and 1 ms end-to-end latency or lower. For eMBB, the requirements on latency and error probability can be less stringent whereas the required supported peak rate and/or spectral efficiency can be higher. In contrast, URLLC requires low latency and high reliability but with less strict data rate requirements.

Figure 6:
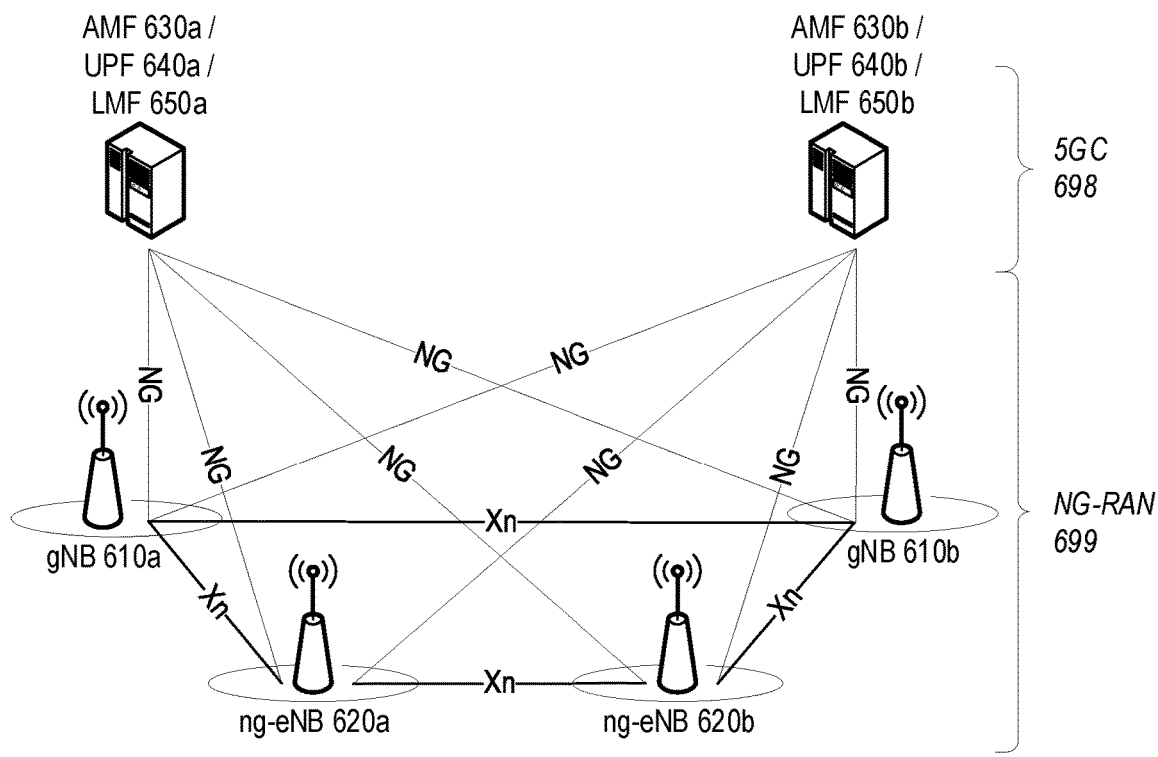
FIG. 6 illustrates a high-level view of a 5G network architecture

FIG. 6 shows a high-level view of an exemplary 5G network architecture, including a Next Generation Radio Access Network (NG-RAN) 699 and a 5G Core (5GC) 698. As shown in the figure, NG-RAN 699 can include gNBs 610 (e.g., 610a,b) and ng-eNBs 620 (e.g., 620a,b) that are interconnected with each other via respective Xn interfaces. The gNBs and ng-eNBs are also connected via the NG interfaces to 5GC 698, more specifically to the AMF (Access and Mobility Management Function) 630 (e.g., AMFs 630a, b) via respective NG-C interfaces and to the UPF (User Plane Function) 640 (e.g., UPFs 640a,b) via respective NG-U interfaces. In some embodiments, 5GC 698 can also include one or more Location Management Functions (LMFs, e.g., LMF 650a,b), which are described in more detail below.

NG-RAN 699 is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signaling transport. In some exemplary configurations, each gNB can be connected to all 5GC nodes within an "AMF Region," which is defined in 3GPP TS 23.501. If security protection for CP and UP data on TNL of NG-RAN interfaces is supported, NDS/IP (3GPP TS 33.601) can be applied.

Each of the gNBs 610a,b can support the NR radio interface, including frequency division duplexing (FDD), time division duplexing (TDD), or a combination thereof. In contrast, each of ng-eNBs 620a,b supports the LTE radio interface but, unlike conventional LTE eNBs (e.g., eNBs 105-115 shown in FIG. 1), connect to the 5GC via the NG interface. In addition, the gNBs 610a,b and ng-eNBs 620a,b can provide multi-RAT (radio access technology) dual connectivity (MR-DC) to UEs as described above, including NG-RAN E-UTRA/NR Dual Connectivity (NGEN-DC).

Each of the gNBs 610a,b can include a central (or centralized) unit (CU or gNB-CU) and one or more distributed (or decentralized) units (DU or gNB-DU). A CU connects to DUs over respective F1 logical interfaces. The CU and connected DUs are only visible to other gNBs and the 5GC as a gNB, e.g., the F1 interface is not visible beyond gNB-CU.

The CUs are logical nodes that host higher-layer protocols and perform various gNB functions such controlling the operation of DUs. For example, a CU can host higher-layer protocols such as, e.g., F1 application part protocol (F1-AP), Stream Control Transmission Protocol (SCTP), GPRS Tunneling Protocol (GTP), Packet Data Convergence Protocol (PDCP), User Datagram Protocol (UDP), Internet Protocol (IP), and Radio Resource Control (RRC) protocol.

Similarly, the DUs are logical nodes that host lower-layer protocols and can include various subsets of the gNB functions, depending on the functional split. For example, a DU can host lower-layer protocols such as, Radio Link Control (RLC), Medium Access Control (MAC), and physical-layer (PHY) protocols. Each of the CUs and DUs can include various circuitry needed to perform their respective functions, including processing circuitry, transceiver circuitry (e.g., for communication), and power supply circuitry. Moreover, the terms "central unit" and "centralized unit" are used interchangeably herein, as are the terms "distributed unit" and "decentralized unit."

Similar to LTE, NR uses CP-OFDM (Cyclic Prefix Orthogonal Frequency Division Multiplexing) in the downlink and both CP-OFDM and DFT-spread OFDM (DFT-S-OFDM) in the uplink. In the time domain, NR downlink and uplink physical resources are organized into equally-sized subframes of 1 ms each. A subframe is further divided into multiple slots of equal duration, with each slot including multiple OFDM-based symbols.

In Rel-15 NR, a UE can be configured with up to four carrier bandwidth parts (BWPs) in the DL with a single DL carrier BWP being active at a given time. A UE can be configured with up to four carrier BWPs in the UL with a single UL carrier BWP being active at a given time. If a UE is configured with a supplementary UL, the UE can be configured with up to four additional carrier BWPs in the supplementary UL, with a single supplementary UL carrier BWP being active at a given time.

Figure 7:
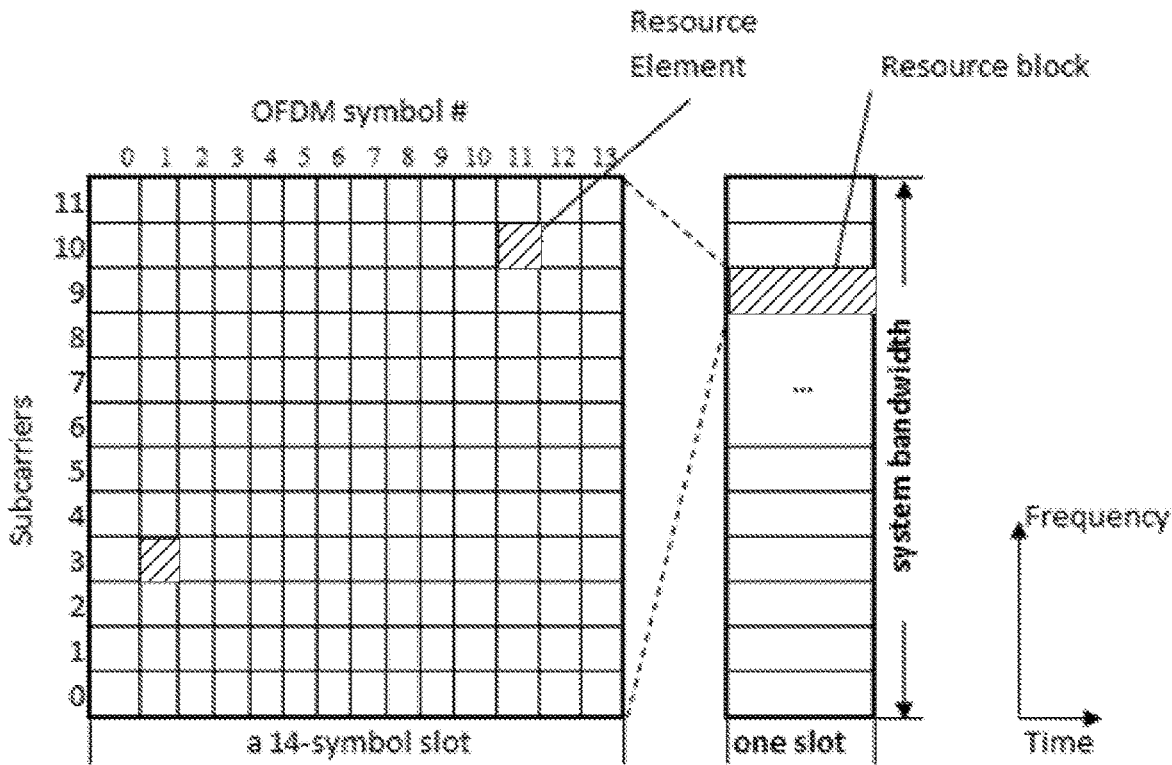
FIG. 7 shows an exemplary time-frequency resource grid for an NR slot.

FIG. 7 shows an exemplary time-frequency resource grid for an NR slot. As illustrated in FIG. 7, a resource block (RB) consists of a group of 12 contiguous OFDM subcarriers for a duration of a 14-symbol slot. Like in LTE, a resource element (RE) consists of one subcarrier in one slot. Common RBs (CRBs) are numbered from 0 to the end of the system bandwidth. Each BWP configured for a UE has a common reference of CRB 0, such that a particular configured BWP may start at a CRB greater than zero. In this manner, a UE can be configured with a narrow BWP (e.g., 10 MHz) and a wide BWP (e.g., 100 MHz), each starting at a particular CRB, but only one BWP can be active for the UE at a given point in time.

Within a BWP, RBs are defined and numbered in the frequency domain from 0 to $N_{BWP}^{size}-1$, where i is the index of the particular BWP for the carrier. Similar to LTE, each NR resource element (RE) corresponds to one OFDM subcarrier during one OFDM symbol interval. NR supports various SCS values $\Delta f=(15 \times 2^\mu)$ kHz, where $\mu \in (0,1,2,3,4)$ are referred to as "numerologies." Numerology $\mu=0$ (i.e., $\Delta f=15$ kHz) provides the basic (or reference) SCS that is also used in LTE. The slot length is inversely related to SCS or numerology according to $\frac{1}{2^\mu}$ ms. For example, there is one (1-ms) slot per subframe for $\Delta f=15$ kHz, two 0.5-ms slots per subframe for $\Delta f=30$ kHz, etc. In addition, the RB bandwidth is directly related to numerology according to $2^\mu \cdot 180$ kHz.

Table 1 below summarizes the supported NR numerologies and associated parameters. Different DL and UL numerologies can be configured by the network.

TABLE 1

| $\mu$ | $\Delta f = 2^\mu \cdot 15$ [kHz] | Cyclic prefix | Slot length | RB BW (MHz) |
| --- | --- | --- | --- | --- |
| 0 | 15 | Normal | 1 ms | 0.18 |
| 1 | 30 | Normal | 0.5 ms | 0.36 |
| 2 | 60 | Normal, Extended | 0.25 ms | 0.72 |
| 3 | 120 | Normal | 125 μs | 1.44 |
| 4 | 240 | Normal | 62.5 μs | 2.88 |

An NR slot can include 14 OFDM symbols for normal cyclic prefix and 12 symbols for extended cyclic prefix. FIG. 8A shows an exemplary NR slot configuration comprising 14 symbols, where the slot and symbols durations are denoted $T_s$ and $T_{symb}$, respectively. In addition, NR includes a Type-B scheduling, also known as "mini-slots." These are shorter than slots, typically ranging from one symbol up to one less than the number of symbols in a slot (e.g., 13 or 11), and can start at any symbol of a slot. Mini-slots can be used if the transmission duration of a slot is too long and/or the occurrence of the next slot start (slot alignment) is too late. Applications of mini-slots include unlicensed spectrum and latency-critical transmission (e.g., URLLC). However, mini-slots are not service-specific and can also be used for eMBB or other services.

Similar to LTE, NR data scheduling is done on a per-slot basis. In each slot, the base station (e.g., gNB) transmits downlink control information (DCI) over PDCCH that indicates which UE is scheduled to receive data in that slot, which RBs will carry that data. A UE first detects and decodes DCI and, if successful, then decodes the corresponding PDSCH based on the decoded DCI. Likewise, DCI can include UL grants that indicate which UE is scheduled to transmit data in that slot, which RBs will carry that data. a UE first detects and decodes an uplink grant from PDCCH and, if successful, then transmits the corresponding PUSCH on the resources indicated by the grant. DCI formats 0_0 and 0_1 are used to convey UL grants for PUSCH, while DCI formats 1_0 and 1_1 are used to convey PDSCH scheduling. Other DCI formats (2_0, 2_1, 2_2 and 2_3) are used for other purposes including transmission of slot format information, reserved resource, transmit power control information, etc.

In NR, there is also a possibility to configure semi-persistent scheduling in the DL, in which a PDSCH transmission periodicity is configured by RRC and then the start and stop of such transmission is controlled by DCI. This technique can reduce control signaling overhead. There is a similar UL scheduling feature, referred to as configured grants (CG).

Within an NR slot, the PDCCH channels are confined to a particular number of symbols and a particular number of subcarriers, where this region is referred to as the control resource set (CORESET). A CORESET is made up of multiple RBs (i.e., multiples of 12 REs) in the frequency domain and either one, two, or three OFDM symbols in the time domain, as further defined in 3GPP TS 38.211 § 7.3.2.2. A CORESET is functionally similar to the control region in LTE subframe. One difference, however, is that in NR, each REG consists of the 12 REs of one OFDM symbol in a RB, whereas an LTE REG includes only four REs, as discussed above. Like in LTE, the CORESET time domain size can be indicated by PCFICH. In LTE, the frequency bandwidth of the control region is fixed (i.e., to the total system bandwidth), whereas in NR, the frequency bandwidth of the CORESET is variable. CORESET resources can be indicated to a UE by RRC signaling.

FIG. 8B shows an exemplary NR slot structure with 15-kHz subcarrier spacing. In this exemplary structure, the first two symbols contain PDCCH and each of the remaining 12 symbols contains physical data channel (PDCH), i.e., either a PDSCH or PUSCH. Depending on the CORESET configuration, however, the first two slots can also carry PDSCH or other information, as required.

FIG. 9 is a block diagram illustrating a high-level architecture for supporting UE positioning in NR networks. As shown in FIG. 9, the NG-RAN 920 can include nodes such as gNB 922 and ng-eNB 921, similar to the architecture shown in FIG. 6. Each ng-eNB may control several transmission points (TPs), such as remote radio heads. Moreover, some TPs can be "PRS-only" for supporting positioning reference signal (PRS)-based TBS for E-UTRAN operation.

In addition, the NG-RAN nodes communicate with an AMF 930 in the 5GC via respective NG-C interfaces (both of which may or may not be present), while the AMF and LMF 940 communicate via an NLs interface 941. In addition, positioning-related communication between UE 910 and the NG-RAN nodes occurs via the RRC protocol, while positioning-related communication between NG-RAN nodes and LMF occurs via an NRPPa protocol. Optionally, the LMF can also communicate with an E-SMLC 950 in an LTE network, such as illustrated in FIG. 4.

LMF 940 can also include, or be associated with, various processing circuitry 942, by which the LMF performs various operations described herein. Processing circuitry 942 can include similar types of processing circuitry as described herein in relation to other network nodes (see, e.g., description of FIG. 16). LMF 940 can also include, or be associated with, a non-transitory computer-readable medium 943 storing instructions (also referred to as a computer program program) that can facilitate the operations of processing circuitry 942. Medium 943 can include similar types of computer memory as described herein in relation to other network nodes (see, e.g., description of FIG. 16).

In a typical operation, the AMF can receive a request for a location service associated with a particular target UE from another entity (e.g., a gateway mobile location center (GMLC)), or the AMF itself can initiate some location service on behalf of a particular target UE (e.g., for an emergency call from the UE). The AMF then sends a location services (LS) request to the LMF. The LMF processes the LS request, which may include transferring assistance data to the target UE to assist with UE-based and/or UE-assisted positioning; and/or positioning of the target UE. The LMF then returns the result of the LS (e.g., a position estimate for the UE and/or an indication of any assistance data transferred to the UE) to the AMF or to another entity (e.g., GMLC) that requested the LS.

An LMF may have a signaling connection to an E-SMLC, enabling the LMF to access information from E-UTRAN, e.g., to support E-UTRA OTDOA positioning using downlink measurements obtained by a target UE. An LMF can also have a signaling connection to an SLP, the LTE entity responsible for user-plane positioning.

Various interfaces and protocols are used for, or involved in, NR positioning. The LTE Positioning Protocol (LPP) is used between a target device (e.g., UE in the control-plane, or SET in the user-plane) and a positioning server (e.g., LMF in the control-plane, SLP in the user-plane). LPP can use either the control- or user-plane protocols as underlying transport. NRPP is terminated between a target device and the LMF. RRC protocol is used between UE and gNB (via NR radio interface) and between UE and ng-eNB (via LTE radio interface).

Furthermore, the NR Positioning Protocol A (NRPPa) carries information between the NG-RAN Node and the LMF, and is transparent to the AMF. As such, the AMF routes the NRPPa PDUs transparently (e.g., without knowledge of the involved NRPPa transaction) over NG-C interface based on a Routing ID corresponding to the involved LMF. More specifically, the AMF carries the NRPPa PDUs over NG-C interface either in UE associated mode or non-UE associated mode. The NGAP protocol between the AMF and an NG-RAN node (e.g., gNB or ng-eNB) is used as transport for LPP and NRPPa messages over the NG-C interface. NGAP is also used to instigate and terminate NG-RAN-related positioning procedures.

LPP/NRPP are used to deliver messages such as positioning capability request, OTDOA positioning measurements request, and OTDOA assistance data to the UE from a positioning node (e.g., location server). LPP/NRPP are also used to deliver messages from the UE to the positioning node including, e.g., UE capability, UE measurements for UE-assisted OTDOA positioning, UE request for additional assistance data, UE configuration parameter(s) to be used to create UE-specific OTDOA assistance data, etc. NRPPa is used to deliver the information between ng-eNB/gNB and LMF in both directions. This can include LMF requesting some information from ng-eNB/gNB, and ng-eNB/gNB providing some information to LMF. For example, this can include information about PRS transmitted by ng-eNB/gNB that are to be used for OTDOA positioning measurements by the UE.

In addition to the LTE positioning methods discussed above, NR may also support one or more of the following position methods:

Multi-RTT: The device (e.g. UE) computes UE Rx-Tx time difference and gNBs compute gNB Rx-Tx time difference. The results are combined to find the UE position based upon round trip time (RTT) calculation.

DL-AoD: gNB or LMF calculates the UE angular position based upon UE DL RSRP measurement results.

UL-AoA: gNB calculates the UL AoA based upon measurements of a UE's UL SRS transmissions.

In the field of wireless communications, multi-antenna technology can comprise a plurality of antennas in combination with advanced signal processing techniques (e.g., beamforming). Multi-antenna technology can be used to improve various aspects of a communication system, including system capacity (e.g., more users per unit bandwidth per unit area), coverage (e.g., larger area for given bandwidth and number of users), and increased per-user data rate (e.g., in a given bandwidth and area). Directional antennas can also ensure better wireless links as a mobile or fixed device experiences a time-varying channel.

For NR, multi-antenna technology is envisioned as an important technology to support operation at millimeter wave (mmW) frequencies in the 5-300 GHz spectrum, which are substantially higher than the 1-5 GHz spectrum used by today's systems. In addition, increasing the numbers of transmit and receive antennas (e.g., $N_T$ and/or $N_R$) can be important for achieving various NR performance goals. In fact, as such mmW systems evolve, both the base stations and terminals could potentially utilize a multitude of antenna elements each, with the actual number of elements limited only by the physical area and/or volume available in each particular application.

In some exemplary configurations, multiple antennas at the transmitter and/or the receiver can be used to shape or "form" the overall antenna pattern or "beam" (e.g., transmit and/or receive beam, respectively) in a desired way to improve the received signal-to-interference-plus-noise ratio (SINR) and, ultimately, system capacity and/or coverage. This can be done, for example, by maximizing the overall antenna gain in the direction of the target receiver or transmitter or by suppressing specific dominant interfering signals.

As used herein, the terms "spatial filtering weights" and "spatial filtering configuration" can refer to antenna weights that are applied at either the transmitter (gNB or UE) or the receiver (UE or gNB) to generate one or more antenna beams used for transmitting and/or receiving data and/or control information. These terms are general in the sense that different propagation environments can lead to different spatial filtering weights that match the transmission/reception of a signal to the channel. Even so, the spatial filtering weights may not always result in a beam in a strict sense.

At mmW frequencies, where high-gain beamforming can be used, each beam is only optimal within a small area, and the link budget outside the optimal beam deteriorates quickly. Hence, frequent and fast beam switching can be necessary to maintain high performance. To support such beam switching, a beam indication framework has been specified in NR. For example, for downlink data transmission (PDSCH), the scheduling DCI includes a transmission configuration indicator (TCI) that informs the UE which transmit beam is used so that it can adjust its receive beam accordingly. This is beneficial for the case of analog Rx beamforming where the UE needs to determine an apply the Rx beamforming weights before it can receive the PDSCH.

The configuration of UE and network node beams in NR can also impact timing measurements needed for positioning a UE. For example, UE transmit and/or receive antenna beams need to be specifically directed to the network nodes for which a timing measurement is measured. As such, it could be difficult for a UE to make a timing measurement with another base station while making a beamformed transmission towards the serving cell. Similarly, network transmit and/or receive antenna beams need to be specifically directed to the UE for which a timing measurement is measured. For example, a beamformed TP transmission of a non-serving cell must be directed specifically toward the non-served UE to facilitate timing measurement by that UE.

Furthermore, Rx-Tx timing measurement is a bidirectional measurement. As such, both transmit and receive beamforming must be performed by both network and UE for each timing measurement. This creates various difficulties particularly for symmetrical bidirectional timing measurements. Moreover, each timing measurement is defined with respect to a particular radio frame i. However, it may not be possible to arrange all necessary beams to transmit and/or receive in a particular frame. This can be particularly problematic with analog beamforming, where the transmitter (receiver) can only transmit (receive) a single beam at any given time. The timing requirement can also be problematic for hybrid beamforming where a limited number (greater than one) of beams may be available at any given time.

Exemplary embodiments of the present disclosure can address these and other issues, problems, and/or difficulties by providing novel techniques for a managing a bidirectional measurement between UE and a network node on two links (e.g., DL and UL) comprising at least one beamformed link. The beamforming may be performed at any one or more of the UE receiver, the UE transmitter, the network node transmitter, and the network node receiver.

Exemplary bidirectional measurements can include timing measurements such as RTT or Rx-Tx time difference. Other exemplary bidirectional measurements can relate to power or quality, including relative RSRP, relative RSRQ, relative SINR, relative path loss, etc. These relative measurements can be based on differences between corresponding component (e.g., single-link) measurements performed for both links/directions. More generally, two or more bidirectional measurement can be combined into a relative measurement by means of a function, including but not limited to a difference (e.g., by subtraction), a ratio (e.g., by division), or another function that can related two or more bidirectional measurements to each other.

In some embodiments, the two links can be asymmetric (e.g., between different pairs of nodes). For example, such asymmetric links can be between one base station and two UEs or between two base stations (e.g., serving and non-serving) and one UE. Such bidirectional measurements with asymmetric links involving a serving node and a non-serving node may facilitate more accurate distance or location estimates, and/or reduced UE complexity, compared to bidirectional measurement with asymmetric links with respect to a non-serving node. Such advantages can be very important in certain applications, such as high-precision/high-accuracy positioning and/or low-complexity positioning. For example, by incorporating multi-site ranging measurements, the accuracy of low-complexity E-CID positioning can be comparable with the accuracy of more complex OTDOA positioning.

In embodiments involving asymmetric links, a relative bidirectional measurement can be a difference of (or some other function relating) two bidirectional measurements that are performed between a node on a first side (e.g., a UE) and a set of two nodes on a second side (e.g., two base stations). The sets of two nodes for the respective bidirectional measurements include one node that is the same in the two sets (e.g., a serving BS), and one node that is different between the two sets (e.g., a non-serving BS).

In some embodiments, the two links can be asymmetric and include at least one beamformed link, according to the embodiments mentioned above.

In various embodiments, managing the bidirectional measurement may include any of the following: performing the measurement, determining or applying a compensation, adapting the transmit and/or receive beamforming, configuring the measurement (e.g., by a network in the network node or by a network node in the UE), reporting a measurement to another node (e.g., by base station to location server or by a UE to base station or by UE to location server), configuring radio signal transmissions (e.g., time-frequency resource allocation, transmit power adapted for new measurements in UL and/or DL, etc.) to enable the measurement (e.g., transmission by the network node, including serving and non-serving nodes, or transmission by the UE or both), storing the measurement in a database, internal or external memory, signaling UE capability to support such bidirectional measurements, etc.

The various embodiments described herein can be applied to a UE in any RRC state, e.g., RRC_CONNECTED, RRC_IDLE, or RRC_INACTIVE.

As discussed herein, a transmit beam may be associated with, and/or determined by, corresponding time-frequency resources (e.g., a first beam-based transmission is in a first time-frequency resources, a second beam-based transmission from the same node is in a second time-frequency resources, etc.). Alternately, a transmit beam may be associated with, and/or determined by, an index (e.g., beam index, resource index, etc.). A beam-based transmission from a network node may include SSB (comprising PSS, SSS, PBCH, and PBCH DM-RS), CSI-RS, DM-RS, TRS, any beamformed DL signal or channel, etc. A beam-based transmission from a UE may include PRACH, SRS, phase tracking reference signal (PTRS), any beamformed UL signal or channel, etc.

As mentioned above, one group of embodiments involve managing a bidirectional measurement between UE and a network node on two links (e.g., DL and UL) comprising at least one beamformed link. In such embodiments, due to beamforming limitations (e.g., with analog or hybrid beamforming), a node may transmit different beams in different time resources that may even be located in different radio frames. Similarly, a node may receive in different directions (e.g., using different beams) in different time resources that may even be located in different radio frames. If a stronger signal is coming via a beam transmitted or received in a different radio frame, requiring the receive-transmit timing difference to be measured in a single radio frame may cause errors in bidirectional NR measurements. FIG. 10 shows an exemplary multibeam transmission over multiple radio frames, according to various exemplary embodiments of the present disclosure. In this exemplary configuration, multi-beam transmissions are spread over multiple DL SSBs, which can be up to K=64 in FR2 frequency range. Furthermore, analog beamforming is employed at the receiving node for one link/direction (e.g., UE for DL, network for UL) of a bidirectional measurement. As such, the receiving node employs a single RX beam (e.g., beam 1 or 2) to receive a single repetition of all TX beams. In this example, radio frame j or j+1 (when UE is using Rx beam 2) may include the strongest DL path while the strongest path for the a different link/direction (e.g., UL) occurs in a different radio frame, such as in frames i or i+1 when the UE is using RX beam 1.

Exemplary embodiments address this difficulty by obtaining the bidirectional measurement with beamforming on at least one link or in at least one direction in relation to a reference time resource (e.g., radio frame) that may differ from the time resource(s) in which the strongest paths of one or both links/directions were received. For example, the reference time resource can be pre-defined, e.g., a radio frame with a specific frame number such as SFN0. Alternately, the time resource can be a function of a periodicity T and/or scaling factor S of beam-based transmissions or receptions determined by beamforming capability, e.g. mod (SFN,T), mod(SFN,T*S), etc.

In other embodiments, the reference time resource can be determined based on a pre-defined rule. For example, the reference time resource can be a time resource associated with one of the measurement components, e.g., the DL component or the transmit component of the RX-TX bidirectional measurement. If multiple beams are transmitted, the reference resource may be the resource (e.g., radio frame) of the beam which is transmitted first. In another example, the reference resource can be the resource of the transmit beam with the first path (expressed as d2=0 in the examples below).

In other embodiments, the reference time resource can be indicated by another node, e.g., to UE by the base station or location server. Reference time resource selection can also implicitly indicate a subset of beamformed measurements. For example, if a base station transmits via different beams in different time resources (e.g., radio frames), then implicitly or explicitly selecting a specific time resource i may imply that only the beam-formed transmissions in this time resource are to be considered for the measurement and not the beamformed transmissions from the same node in time resources i+1, etc. Alternately, the subset of beams limited to a single time resource (out of a larger set of beams used in more than one time resource) for bidirectional measurement can also be selected prior to the measurement and, in some cases, provided to the measuring node together with and/or as part of the measurement configuration.

In other embodiments, if due to beamforming, there are transmissions from the same node in different directions and in different time resources (e.g., radio frames), then a bidirectional measurement may be performed for each of these time resources using different reference time resources (although the same for both directions). As such, multiple measurement results can be produced by the measuring node associated with different reference time resources. The measuring node may then choose one measurement result (e.g., the best, the shortest, etc.) out of the multiple measurement results for the same pair of nodes for further operations. The measuring node may also report multiple measurement results and the associated reference time resources to another node, which may further select a single measurement result for the same pair of nodes.

To obtain the bidirectional measurement with respect to a specific reference time resource, the measuring node (e.g., UE for UE Rx-Tx measurement, base station for gNB Rx-Tx measurement or UE timing advance) may need to apply a compensation for the timing difference due to TX and/or RX beamforming limitations. In one example, the compensation may be determined as:

$$T\_rx'=T\_rx+\text{delta1},$$

$$T\_tx'=T\_tx+\text{delta2},$$

giving bidirectional measurement T_rxtx of $$T\_rxtx=T\_rx'-T\_tx'=T\_rx-T\_tx+(\text{delta1}-\text{delta2})$$
$$=T\_rxtx=T\_rx-T\_tx+\text{delta3},$$

where the compensation amounts of delta1, delta2, and delta3 may be positive or negative, and at least one of delta1, delta2, and delta3 is non-zero when the corresponding measurement component(s) occur(s) in the reference time resource. The compensation amount may be applied by the measuring node (e.g., UE or base station) or by the network node receiving the measurement (e.g., base station or location server). The compensation amount may be determined autonomously by the node applying the compensation or based on a message or assistance from the other node involved in the measurement.

In one example, at least one of delta1 and delta2 are determined based on TX and/or RX beamforming configuration including, e.g., number of beams, beam scheduling, best beam indication (if by network), etc. In another example, at least one of delta1 and delta2 are implicitly or explicitly indicated by the network node, e.g., via the radio signal configuration or time resources allocation for the radio signal to be used for the bidirectional measurement.

Furthermore, in various embodiments, managing a bidirectional measurement with beamforming on at least one link or in at least one direction can include one or more of the following operations (where "another node" can refer to a UE):

Determining an amount of compensation depending on beamforming to obtain the correct bidirectional measurement;

Applying the compensation;

Signaling to another node an amount of compensation to be applied for a certain bidirectional measurement or a parameter to be used to derive the amount (e.g., from base station to location server or to UE, from location server to UE, from one base station to another base station, from), e.g., when the compensation is applied by another node (e.g., determined by a network node and applied by the UE);

Signaling to another node an amount of the already applied compensation or a parameter which can be used by the other node to determine the amount (e.g., from UE to base station or to location server, from base station to location server, from one base station to another base station);

Signaling to another node an indication indicative of whether a compensation has been applied for a certain bidirectional measurement to compensate for beamforming (e.g., from UE to base station or to location server, from base station to location server, from one base station to another base station);

Signaling to another node an indication or a command on whether a compensation needs to be applied for a certain bidirectional measurement to compensate for beamforming (e.g., from UE to base station or to location server, from base station to location server, from one base station to another base station);

Signaling or reporting of the bidirectional measurement determined and/or compensated based on the examples described herein;

Adapting the receive beamforming, determining the best receive beam prior to the measurement and using for the measurement, to avoid or reduce the need for compensation due to receive beamforming (delta2=0), e.g., prior to the bidirectional measurement determine the best receive beam and use it for the measurement;

Adapting the transmit beamforming, determining the best transmit beam prior to the measurement and using it for transmitting; for example: determining by the UE of the transmit direction to a non-serving base station based on the UE receive direction for the DL component of the bidirectional measurement, hence avoiding the need to transmit via multiple UE tx beams and avoiding or reducing the need for compensation; and Determining a subset of transmit beams to measure (or the associated time-frequency resource and the comprised signal) out of a plurality of transmit beams (or associated resources) based on a message from a network node, where the subset may comprise one or more transmit beams to measure.

As mentioned above, a second group of exemplary embodiments involve managing a bidirectional measurement between UE and a network node on two links (e.g., DL and UL) that are asymmetric. In general, asymmetric links can refer to a situation where the distance in a first direction between two nodes of a first pair is different from the distance in a second direction between two nodes of a second pair. For example, the first and second pairs can have one node in common and one node that differs between the two pairs.

FIG. 11, which includes FIGS. 11A and 11B, illustrates two exemplary scenarios for bidirectional measurements with asymmetric links, according to various exemplary embodiments of the present disclosure. In FIG. 11A, the first link/direction is an UL from the first UE (UE1 1130) to a radio network node (e.g., base station, BS 1110), while the second link/direction a DL from the same radio network node (BS 1110) to a second UE (UE2 1140). For example, FIG. 11A can represent a scenario where UE1 and UE2 are cooperative and/or coupled with each other, so that one of the UEs is receiving and the other one is transmitting. In some embodiments, the radio network node may be non-serving for at least one UE, or may be serving for both UEs.

In the illustrative scenario shown in FIG. 11B, the first link/direction is an UL from a UE 1130 to a first radio network node (e.g., BS1 1110), while the second link/direction a DL from a second radio network node (e.g., BS2 1120) to the same UE 1130. At least one of the first and second radio network nodes is a non-serving node for the UE. For example, one link can be measured based on DL SSBs (or components thereof), while the other link can be measured on UL transmission such as RACH or SRS. Other examples of DL transmissions include DM-RS, CSI-RS, TRS, and other DL reference signal or channels. Other examples of UL transmissions include PTRS and other UL reference signal or channels.

Such embodiments can be advantageous for UEs that utilize transmit beamforming by avoiding the need to direct a UE transmit beam to a non-serving radio network node. This operation can be challenging, difficult, and/or impractical for various reasons. For example, some UEs may be incapable of supporting beam correspondence, and thus have difficulty associating a UE UL transmit beam with a corresponding UE DL receive beam. On the other hand, UEs able to make such associations can be configured with bidirectional measurements with symmetric links for non-serving nodes. Accordingly, in some embodiments, a configuration of asymmetric or symmetric links for bidirectional measurement can be chosen depending on any UE capability (e.g., beamforming) needed to support such measurements, which can signalled to a radio network node or a location server.

Note that in both scenarios shown in FIGS. 11A-B, the first direction may be DL (or to the UE) and the second direction may be UL (or from the UE), or vice versa. As such, embodiments can be similarly advantageous for non-serving network nodes to avoid the need to receive UE transmissions for measurements, thereby reducing signaling overhead in the network.

More generally, a bidirectional measurement with asymmetric links can be defined and/or configured between a node on a first side and a set of two nodes on the second side. In some embodiments, at least one of the two nodes in the set can communicate with the other node in the set (directly or via a third node, e.g., location server) to facilitate the bidirectional measurement with asymmetric links. In the scenario of FIG. 11B, the communication may be via Xn interface between gNBs (e.g., similar to X2 in LTE), while in FIG. 11A, the UE1-UE2 communication may be via a device-to-device (D2D) communication interface, which is commonly referred to as sidelink (SL) or PC5.

In various embodiments, the communication between cooperating nodes of the set can include and/or be based on any of the following:

- Communicating a radio signal transmission configuration or a measurement pattern for one or both links on which the bidirectional measurement is to be based;
- Bidirectional measurement or its one or both components (e.g., for one or both directions) or a function of two or more bidirectional measurements (e.g., relative bidirectional measurement or a difference between two bidirectional measurements). Note that to report a bidirectional measurement (compensated or non-compensated) with asymmetric links, the reporting node may also need to report (implicitly or explicitly) the node(s) involved in the measurement. This could be done explicitly by include node and/or cell IDs. This could also be done implicitly via measurement ID, where the measurement configuration may include the involved nodes/cells may be already indicated and/or known to the measuring node. If one of the asymmetric links is the serving link, then the ID of the serving node or cell may be unnecessary, especially is the same serving links is configured for multiple bidirectional measurements involving different non-serving nodes.
- Compensated bidirectional measurement, to account for the asymmetric links (as explained further below);
- Any compensation (e.g., due to beamforming or due to link asymmetry) that is to be applied to obtain the measurement or that has been applied;
- reference time resource (as discussed above);
- Known or estimated distance for one of the asymmetric links (referred to as d2), or a value/parameter/measurement which can be used to derive d2;
- Signaling of power control and/or power reduction parameters adapted for bidirectional measurements with asymmetric links; and
- An indication of the amount of asymmetry between the two links, e.g., propagation time difference or distance difference.

Furthermore, the node on the first side may be informed about the nodes of the set on the second side. The information may be provided by one of the nodes in the set directly or via a third node. For example, a location server can inform the UE about at least one node in the set for which a bidirectional measurement with asymmetric links is to be performed, while the other node in the set may be known to the UE (e.g., a serving node). The information about the nodes can include any of the following:

- Radio signal transmission configuration or a transmission pattern/scheduling for one or both nodes in the set;
- Radio signal transmission configuration or a transmission pattern/scheduling for the first side needed to be received by one of the nodes in the set;
- Configuration of a beamformed transmission or corresponding antenna configuration of one or both nodes in the set adapted to reach the node of the first side;
- Configuration of a beamformed transmission or corresponding antenna configuration of the node on the first side needed to reach a node of the second side;
- Identity(-ies) related to one or both of the two nodes of the set (e.g., cell ID, transmission point ID, beam ID, etc.);
- Parameter(s) related to the distance difference or radio propagation time difference between the two nodes in the set (e.g., search window for one of the nodes with respect to the other node in the set),
- Any compensation for the bidirectional measurement (e.g., as discussed below);
- Signaling of power control and/or power reduction parameters adapted for bidirectional measurements with asymmetric links (e.g., UL power control for the uplink comprising one of the two links of the bidirectional measurement with asymmetric links). In such case, the resulting UL transmit power may be higher than for a serving link if the UL is towards a non-serving radio network node, or the resulting DL transmit power may be higher than for UEs in the served cell if the power-controlled DL is for a UE in another cell.

In case of asymmetric links, the bidirectional measurement may be viewed as RTT for the average of the two distances, i.e., between the node on one side and the set of two nodes on the other side. However, to find the distance between the node on a first side and one of the nodes on the second side, there may be a need for a compensation to the RX-TX measurement. Two different exemplary embodiments for determining and/or applying compensation for the RX-TX measurements are described below. In both embodiments, variable bidirectionalMeasurement represents a bidirectional measurement result for asymmetric links, and c is the speed of light.

In the first embodiment (also referred to as Method 1), bidirectionalMeasurement' represents a compensated bidirectional measurement result for asymmetric links, e.g., bidirectionalMeasurement'=bidirectionalMeasurement+ compensation. In this embodiment, compensation can be positive or negative depending on whether the link of interest (corresponding to distance d1) is the "longest" or "shortest" among the two links in the bidirectional measurement. In this embodiment, d1=c*bidirectionalMeasurement'/2.

In the second embodiment (referred to as Method 2), d1 is an unknown distance between the node on the first side and the first node in the set on the second side, while d2 is a known or estimated distance (e.g., for the serving link) between the node on the first side and the second node in the set on the second side. In this embodiment, d1=c*bidirectionalMeasurement−d2.

According to these embodiments, a compensation for the link asymmetry (or distance difference) can be applied to the bidirectional measurement. The amount of compensation can be determined by the measuring node or by another node or received in a message. The compensated measurement may correspond then to the RTT≈2*d/c where is d is distance on a link.

The embodiments described above can be further illustrated with reference to FIG. 12, which depicts an exemplary method (e.g., procedure) that can be performed by a UE, a radio network node, or an LMF in various embodiments. Put differently, various features of the operations described below correspond to various embodiments described above.

Figure 12A:
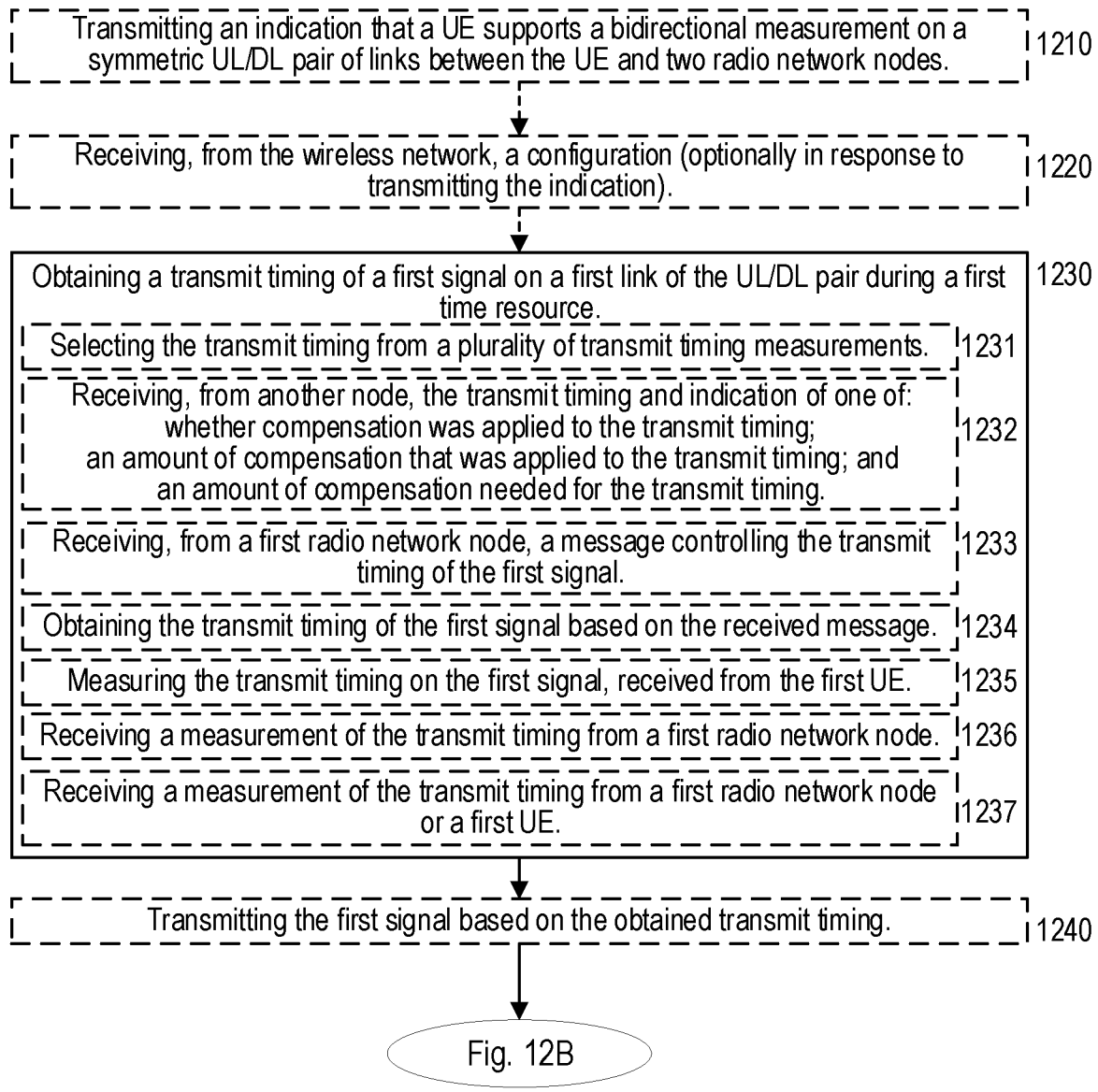

In particular, FIG. 12 shows a flow diagram of an exemplary method (e.g., procedure) for managing bidirectional measurements of signals on an uplink/downlink pair between one or more first nodes and one or more second nodes in a wireless network (e.g., E-UTRAN, NG-RAN), according to various exemplary embodiments of the present disclosure. Although FIG. 12 shows specific blocks in a particular order, the operations of the exemplary method can be performed in a different order than shown and can be combined and/or divided into blocks having different functionality than shown. Optional blocks or operations are indicated by dashed lines. In the following description, unless otherwise noted, the term "node" is used generically with embodiments associated with a variety of different entities, while a specific type of "node" (e.g., UE) is used with embodiments associated with that specific type.

The exemplary method can include the operations of block 1230, where the node can obtain a transmit timing of a first signal on a first link of the UL/DL pair during a first time resource. The exemplary method can include the operations of block 1250, where the node can obtain a receive timing of a second signal on a second link of the UL/DL pair during a second time resource. The exemplary method can also include the operations of block 1260, where the node can determine the bidirectional measurement based on the obtained transmit timing and obtained receive timing. Furthermore, at least one of the following conditions applies:

the first and second links are between one first node and two respective second nodes;

at least one of the first link and the second link are associated with a non-serving carrier frequency; and at least one of the first link and the second link are managed via one or more beams.

In some embodiments, the first time resource and the second time resource are different (e.g., different subframes or different radio frames).

In some embodiments, at least one of the transmit timing and receive timing can be defined with respect to a reference time resource, which is one of the following:

a pre-defined time resource, the first time resource, the second time resource, a time resource of a first beam in the one or more beams, or a time resource indicated by another node.

In some of these embodiments, where the reference time resource is the second time resource, the second signal can be a beamformed transmission from a non-serving cell associated with one of the second nodes, and the first signal can be a beamformed transmission from the first node.

In some embodiments, the operations of block 1230 can include the operations of sub-block 1231, where the node can select the transmit timing from a plurality of transmit timing measurements. Alternately or in addition, the operations of block 1250 can include the operations of sub-block 1251, where the node can select the receive timing from a plurality of receive timing measurements.

In some embodiments, the operations of block 1260 can include the operations of sub-block 1262, where the node can apply a compensation to at least one of the transmit timing, the receive timing, and the bidirectional measurement. In such embodiments, the compensation can be based on one or more of the following:

a timing difference due to transmit beamforming on at least one of the first link and the second link, wherein transmissions of the first signal via different transmit beams are associated with different time resources;

a timing difference due to receive beamforming on at least one of the first and second links, wherein receiving of the second signal via different receive beams is associated with different time resources; and a difference between respective propagation distances or propagation times of the first link and the second link.

In some embodiments, the operations of block 1260 can also include the operations of sub-block 1261, where the node can determine the compensation autonomously or based on information received from another node.

In some embodiments, the exemplary method can include the operations of block 1270, where the node can send the bidirectional measurement to a third node (e.g., radio network node, positioning node etc.). In such embodiments, the compensation can be applied before or after sending the bidirectional measurement to the third node. In some cases, the bidirectional measurement can be sent to the third node together with an indication of one of the following:

whether compensation was applied to the bidirectional measurement;

an amount of compensation that was applied to the bidirectional measurement; and an amount of compensation needed for the bidirectional measurement.

In some embodiments, the operations of block 1230 can include the operations of sub-block 1232, where the node can receive, from another node in the wireless network, the transmit timing and an indication of one of the following:

whether compensation was applied to the transmit timing, an amount of compensation that was applied to the transmit timing, or an amount of compensation needed for the transmit timing.

Alternately or in addition, the operations of block 1250 can include the operations of sub-block 1252, where the node can receive, from another node in the wireless network, the receive timing and an indication of one of the following:

whether compensation was applied to the receive timing, an amount of compensation that was applied to the receive timing, or an amount of compensation needed for the receive timing.

In some embodiments, the exemplary method can also include the operations of block 1280, where the node can determine a position of a user equipment (UE) based on the bidirectional measurement.

In some embodiments, the method can be performed by a UE. In such embodiments, the operations of block 1230 can include the operations of sub-blocks 1233-1234. In sub-block 1233, the UE can receive, from a first radio network node, a message controlling the transmit timing of the first signal (e.g., a timing advance). In sub-block 1234, the UE can obtain the transmit timing of the first signal based on the message (e.g., the timing advance). Furthermore, in such embodiments, the exemplary method can also include the operations of block 1240, where the UE can transmit the first signal based on the obtained transmit timing. Additionally, the operations of block 1250 can include the operations of sub-block 1252, where the UE can measure the receive timing on the second signal, wherein the second signal is received from the first radio network node or a second network node.

In some of these embodiments, the first link is an UL between the UE and a first radio network node, wherein the first radio network node is a serving node for the UE. In addition, the second link is DL between a second radio network node and the UE, wherein the second radio network node is a non-serving node for the UE and the second signal is received from the second radio network node. An example of such embodiments is illustrated in FIG. 11B.

In other of these embodiments, the first and second time resources are different subframes or different radio frames. In such case, the second signal is received, from the first radio network node, during the second time resource using a second beam, while the first signal is transmitted during the first time resource using one or more first beams that are different from the second beam. An example of such embodiments is illustrated in FIG. 10.

Some of the UE-performed embodiments include the operations of block 1220, where the UE can receive, from the wireless network, a configuration including one or more of the following:
- identification of at least one of the first time resource and the second time resource;
- beamforming configuration associated with transmission of the first signal;
- transmit timing advance for the first signal;
- power control for transmission of the first signal;
- transmission resources or timing pattern associated with the first signal;
- beamforming configuration associated with the second signal;
- transmission or reception resources or transmission or reception timing pattern associated with the second signal;
- difference between the respective propagation distances of the first link and the second link; and
- indication of whether compensation should be applied to one or more of the transmit timing and the receive timing.

In some of these embodiments, the exemplary method can also include the operations of block 1210, where the UE can transmit an indication that the UE supports a bidirectional measurement on an asymmetric UL/DL pair between the UE and two radio network nodes. In such case, the configuration can be received (e.g., in block 1220) in response to the transmitted indication.

In other embodiments, the first and second links are between the first node and the two respective second nodes. In such case, the first link is an UL between a first user equipment, UE, and a first radio network node, and the second link is DL between the first radio network node and a second UE. An example of such embodiments is illustrated in FIG. 11A.

In some of these embodiments, the method can be performed by the first radio network node or by a positioning node in the wireless network (e.g., LMU). In such embodiments, the operations of block 1230 can include the operations of sub-block 1235, where the first radio network node can measure the transmit timing on the first signal, received from the first UE. In addition, the operations of block 1250 can include the operations of sub-blocks 1254-1255, where the first radio network node can transmit the second signal and receive a measurement of the receive timing from the second UE.

In other of these embodiments (e.g., illustrated by FIG. 11A), the method can be performed by a location management function (LMF) coupled to the wireless network. In such embodiments, the operations of block 1230 can include the operations of sub-block 1236, where the LMF can receive a measurement of the transmit timing from a first radio network node. In addition, the operations of block 1250 can include the operations of sub-block 1256, where the LMF can receive a measurement of the receive timing from the second UE or the first radio network node.

In yet other embodiments, the method can be performed by an LMF coupled to the wireless network. These embodiments are applicable to any of the arrangements shown in FIGS. 10, 11A, and 11B. In such embodiments, the operations of block 1230 can include the operations of sub-block 1237, where the LMF can receive a measurement of the transmit timing from a first UE or a first radio network node. In addition, the operations of block 1250 can include the operations of sub-block 1257, where the LMF can receive a measurement of the receive timing from a second UE or a second radio network node.

Although various embodiments are described above in terms of methods, techniques, and/or procedures, the person of ordinary skill will readily comprehend that such methods, techniques, and/or procedures can be embodied by various combinations of hardware and software in various systems, communication devices, computing devices, control devices, apparatuses, non-transitory computer-readable media, computer program products, etc.

Figure 13:
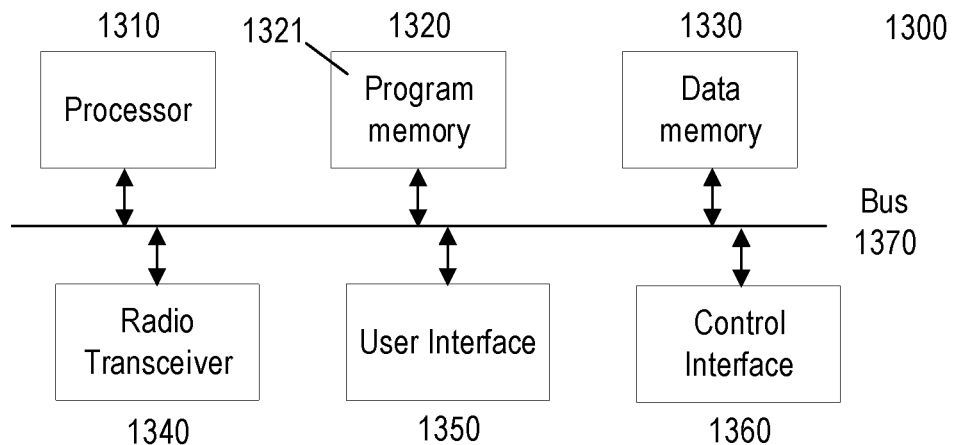
FIG. 13 is a block diagram of an exemplary wireless device or UE according to various exemplary embodiments of the present disclosure.

FIG. 13 shows a block diagram of an exemplary wireless device or user equipment (UE) 1300 (hereinafter referred to as "UE 1300") according to various embodiments of the present disclosure, including those described above with reference to other figures. For example, UE 1300 can be configured by execution of instructions, stored on a computer-readable medium, to perform operations corresponding to one or more of the exemplary methods described herein.

UE 1300 can include a processor 1310 (also referred to as "processing circuitry") that can be operably connected to a program memory 1320 and/or a data memory 1330 via a bus 1370 that can comprise parallel address and data buses, serial ports, or other methods and/or structures known to those of ordinary skill in the art. Program memory 1320 can store software code, programs, and/or instructions (collectively shown as computer program product 1321 in FIG. 13) that, when executed by processor 1310, can configure and/or facilitate UE 1300 to perform various operations, including operations corresponding to various exemplary methods described herein. As part of or in addition to such operations, execution of such instructions can configure and/or facilitate UE 1300 to communicate using one or more wired or wireless communication protocols, including one or more wireless communication protocols standardized by 3GPP, 3GPP2, or IEEE, such as those commonly known as 5G/NR, LTE, LTE-A, UMTS, HSPA, GSM, GPRS, EDGE, 1xRTT, CDMA2000, 802.11 WiFi, HDMI, USB, Firewire, etc., or any other current or future protocols that can be utilized in conjunction with radio transceiver 1340, user interface 1350, and/or control interface 1360.

As another example, processor 1310 can execute program code stored in program memory 1320 that corresponds to MAC, RLC, PDCP, and RRC layer protocols standardized by 3GPP (e.g., for NR and/or LTE). As a further example, processor 1310 can execute program code stored in program memory 1320 that, together with radio transceiver 1340, implements corresponding PHY layer protocols, such as Orthogonal Frequency Division Multiplexing (OFDM), Orthogonal Frequency Division Multiple Access (OFDMA), and Single-Carrier Frequency Division Multiple Access (SC-FDMA). As another example, processor 1310 can execute program code stored in program memory 1320 that, together with radio transceiver 1340, implements device-to-device (D2D) communications with other compatible devices and/or UEs.

Program memory 1320 can also include software code executed by processor 1310 to control the functions of UE 1300, including configuring and controlling various components such as radio transceiver 1340, user interface 1350, and/or control interface 1360. Program memory 1320 can also comprise one or more application programs and/or modules comprising computer-executable instructions embodying any of the exemplary methods described herein. Such software code can be specified or written using any known or future developed programming language, such as e.g., Java, C++, C, Objective C, HTML, XHTML, machine code, and Assembler, as long as the desired functionality, e.g., as defined by the implemented method steps, is preserved. In addition, or as an alternative, program memory 1320 can comprise an external storage arrangement (not shown) remote from UE 1300, from which the instructions can be downloaded into program memory 1320 located within or removably coupled to UE 1300, so as to enable execution of such instructions.

Data memory 1330 can include memory area for processor 1310 to store variables used in protocols, configuration, control, and other functions of UE 1300, including operations corresponding to, or comprising, any of the exemplary methods described herein. Moreover, program memory 1320 and/or data memory 1330 can include non-volatile memory (e.g., flash memory), volatile memory (e.g., static or dynamic RAM), or a combination thereof. Furthermore, data memory 1330 can comprise a memory slot by which removable memory cards in one or more formats (e.g., SD Card, Memory Stick, Compact Flash, etc.) can be inserted and removed.

Persons of ordinary skill will recognize that processor 1310 can include multiple individual processors (including, e.g., multi-core processors), each of which implements a portion of the functionality described above. In such cases, multiple individual processors can be commonly connected to program memory 1320 and data memory 1330 or individually connected to multiple individual program memories and or data memories. More generally, persons of ordinary skill in the art will recognize that various protocols and other functions of UE 1300 can be implemented in many different computer arrangements comprising different combinations of hardware and software including, but not limited to, application processors, signal processors, general-purpose processors, multi-core processors, ASICs, fixed and/or programmable digital circuitry, analog baseband circuitry, radio-frequency circuitry, software, firmware, and middleware.

Radio transceiver 1340 can include radio-frequency transmitter and/or receiver functionality that facilitates the UE 1300 to communicate with other equipment supporting like wireless communication standards and/or protocols. In some exemplary embodiments, the radio transceiver 1340 includes one or more transmitters and one or more receivers that enable UE 1300 to communicate according to various protocols and/or methods proposed for standardization by 3GPP and/or other standards-setting organizations (SSOs). For example, such functionality can operate cooperatively with processor 1310 to implement a PHY layer based on OFDM, OFDMA, and/or SC-FDMA technologies, such as described herein with respect to other figures.

In some exemplary embodiments, radio transceiver 1340 includes one or more transmitters and one or more receivers that can facilitate the UE 1300 to communicate with various LTE, LTE-Advanced (LTE-A), and/or NR networks according to standards promulgated by 3GPP. In some exemplary embodiments of the present disclosure, the radio transceiver 1340 includes circuitry, firmware, etc. necessary for the UE 1300 to communicate with various NR, NR-U, LTE, LTE-A, LTE-LAA, UMTS, and/or GSM/EDGE networks, also according to 3GPP standards. In some embodiments, radio transceiver 1340 can include circuitry supporting D2D communications between UE 1300 and other compatible devices.

In some embodiments, radio transceiver 1340 includes circuitry, firmware, etc. necessary for the UE 1300 to communicate with various CDMA2000 networks, according to 3GPP2 standards. In some embodiments, the radio transceiver 1340 can be capable of communicating using radio technologies that operate in unlicensed frequency bands, such as IEEE 802.11 WiFi that operates using frequencies in the regions of 2.4, 5.6, and/or 60 GHz. In some embodiments, radio transceiver 1340 can include a transceiver that is capable of wired communication, such as by using IEEE 802.3 Ethernet technology. The functionality particular to each of these embodiments can be coupled with and/or controlled by other circuitry in the UE 1300, such as the processor 1310 executing program code stored in program memory 1320 in conjunction with, and/or supported by, data memory 1330.

User interface 1350 can take various forms depending on the particular embodiment of UE 1300, or can be absent from UE 1300 entirely. In some embodiments, user interface 1350 can comprise a microphone, a loudspeaker, slidable buttons, depressible buttons, a display, a touchscreen display, a mechanical or virtual keypad, a mechanical or virtual keyboard, and/or any other user-interface features commonly found on mobile phones. In other embodiments, the UE 1300 can comprise a tablet computing device including a larger touchscreen display. In such embodiments, one or more of the mechanical features of the user interface 1350 can be replaced by comparable or functionally equivalent virtual user interface features (e.g., virtual keypad, virtual buttons, etc.) implemented using the touchscreen display, as familiar to persons of ordinary skill in the art. In other embodiments, the UE 1300 can be a digital computing device, such as a laptop computer, desktop computer, workstation, etc. that comprises a mechanical keyboard that can be integrated, detached, or detachable depending on the particular embodiment. Such a digital computing device can also comprise a touch screen display. Many exemplary embodiments of the UE 1300 having a touch screen display are capable of receiving user inputs, such as inputs related to exemplary methods described herein or otherwise known to persons of ordinary skill.

In some embodiments, UE 1300 can include an orientation sensor, which can be used in various ways by features and functions of UE 1300. For example, the UE 1300 can use outputs of the orientation sensor to determine when a user has changed the physical orientation of the UE 1300's touch screen display. An indication signal from the orientation sensor can be available to any application program executing on the UE 1300, such that an application program can change the orientation of a screen display (e.g., from portrait to landscape) automatically when the indication signal indicates an approximate 90-degree change in physical orientation of the device. In this exemplary manner, the application program can maintain the screen display in a manner that is readable by the user, regardless of the physical orientation of the device. In addition, the output of the orientation sensor can be used in conjunction with various exemplary embodiments of the present disclosure.

A control interface 1360 of the UE 1300 can take various forms depending on the particular exemplary embodiment of UE 1300 and of the particular interface requirements of other devices that the UE 1300 is intended to communicate with and/or control. For example, the control interface 1360 can comprise an RS-232 interface, a USB interface, an HDMI interface, a Bluetooth interface, an IEEE ("Firewire") interface, an $I^2C$ interface, a PCMCIA interface, or the like. In some exemplary embodiments of the present disclosure, control interface 1360 can comprise an IEEE 802.3 Ethernet interface such as described above. In some exemplary embodiments of the present disclosure, the control interface 1360 can comprise analog interface circuitry including, for example, one or more digital-to-analog converters (DACs) and/or analog-to-digital converters (ADCs).

Persons of ordinary skill in the art can recognize the above list of features, interfaces, and radio-frequency communication standards is merely exemplary, and not limiting to the scope of the present disclosure. In other words, the UE 1300 can comprise more functionality than is shown in FIG. 13 including, for example, a video and/or still-image camera, microphone, media player and/or recorder, etc. Moreover, radio transceiver 1340 can include circuitry necessary to communicate using additional radio-frequency communication standards including Bluetooth, GPS, and/or others. Moreover, the processor 1310 can execute software code stored in the program memory 1320 to control such additional functionality. For example, directional velocity and/or position estimates output from a GPS receiver can be available to any application program executing on the UE 1300, including any program code corresponding to and/or embodying any exemplary embodiments (e.g., of methods) described herein.

Figure 14:
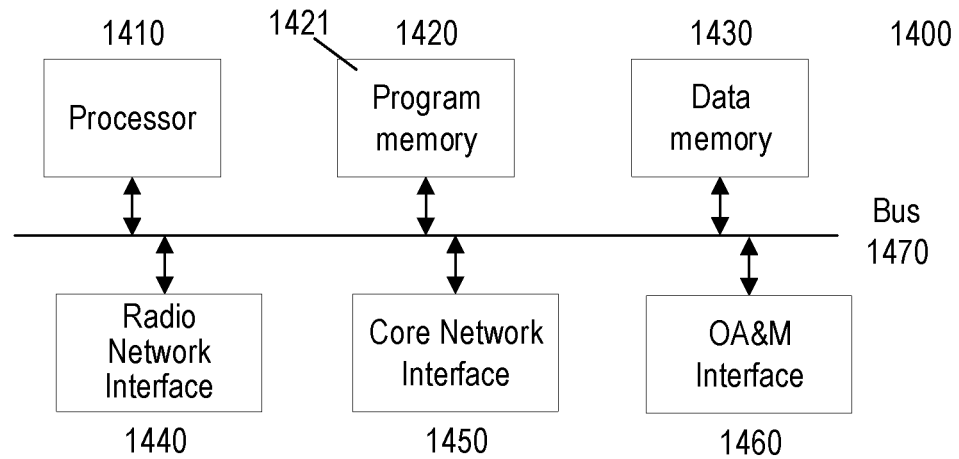
FIG. 14 is a block diagram of an exemplary network node according to various exemplary embodiments of the present disclosure.

FIG. 14 shows a block diagram of an exemplary network node 1400 according to various embodiments of the present disclosure, including those described above with reference to other figures. For example, exemplary network node 1400 can be configured by execution of instructions, stored on a computer-readable medium, to perform operations corresponding to one or more of the exemplary methods described herein. In some exemplary embodiments, network node 1400 can comprise a base station, eNB, gNB, or one or more components thereof. For example, network node 1400 can be configured as a central unit (CU) and one or more distributed units (DUs) according to NR gNB architectures specified by 3GPP. More generally, the functionally of network node 1400 can be distributed across various physical devices and/or functional units, modules, etc.

Network node 1400 can include processor 1410 (also referred to as "processing circuitry") that is operably connected to program memory 1420 and data memory 1430 via bus 1470, which can include parallel address and data buses, serial ports, or other methods and/or structures known to those of ordinary skill in the art.

Program memory 1420 can store software code, programs, and/or instructions (collectively shown as computer program product 1421 in FIG. 14) that, when executed by processor 1410, can configure and/or facilitate network node 1400 to perform various operations, including operations corresponding to various exemplary methods described herein. As part of and/or in addition to such operations, program memory 1420 can also include software code executed by processor 1410 that can configure and/or facilitate network node 1400 to communicate with one or more other UEs or network nodes using other protocols or protocol layers, such as one or more of the PHY, MAC, RLC, PDCP, and RRC layer protocols standardized by 3GPP for LTE, LTE-A, and/or NR, or any other higher-layer (e.g., NAS) protocols utilized in conjunction with radio network interface 1440 and/or core network interface 1450. By way of example, core network interface 1450 can comprise the S1 or NG interface and radio network interface 1440 can comprise the Uu interface, as standardized by 3GPP. Program memory 1420 can also comprise software code executed by processor 1410 to control the functions of network node 1400, including configuring and controlling various components such as radio network interface 1440 and core network interface 1450.

Data memory 1430 can comprise memory area for processor 1410 to store variables used in protocols, configuration, control, and other functions of network node 1400. As such, program memory 1420 and data memory 1430 can comprise non-volatile memory (e.g., flash memory, hard disk, etc.), volatile memory (e.g., static or dynamic RAM), network-based (e.g., "cloud") storage, or a combination thereof. Persons of ordinary skill in the art will recognize that processor 1410 can include multiple individual processors (not shown), each of which implements a portion of the functionality described above. In such case, multiple individual processors may be commonly connected to program memory 1420 and data memory 1430 or individually connected to multiple individual program memories and/or data memories. More generally, persons of ordinary skill will recognize that various protocols and other functions of network node 1400 may be implemented in many different combinations of hardware and software including, but not limited to, application processors, signal processors, general-purpose processors, multi-core processors, ASICs, fixed digital circuitry, programmable digital circuitry, analog baseband circuitry, radio-frequency circuitry, software, firmware, and middleware.

Radio network interface 1440 can comprise transmitters, receivers, signal processors, ASICs, antennas, beamforming units, and other circuitry that enables network node 1400 to communicate with other equipment such as, in some embodiments, a plurality of compatible user equipment (UE). In some embodiments, interface 1440 can also enable network node 1400 to communicate with compatible satellites of a satellite communication network. In some exemplary embodiments, radio network interface 1440 can comprise various protocols or protocol layers, such as the PHY, MAC, RLC, PDCP, and/or RRC layer protocols standardized by 3GPP for LTE, LTE-A, LTE-LAA, NR, NR-U, etc.; improvements thereto such as described herein above; or any other higher-layer protocols utilized in conjunction with radio network interface 1440. According to further exemplary embodiments of the present disclosure, the radio network interface 1440 can comprise a PHY layer based on OFDM, OFDMA, and/or SC-FDMA technologies. In some embodiments, the functionality of such a PHY layer can be provided cooperatively by radio network interface 1440 and processor 1410 (including program code in memory 1420).

Core network interface 1450 can comprise transmitters, receivers, and other circuitry that enables network node 1400 to communicate with other equipment in a core network such as, in some embodiments, circuit-switched (CS) and/or packet-switched Core (PS) networks. In some embodiments, core network interface 1450 can comprise the S1 interface standardized by 3GPP. In some embodiments, core network interface 1450 can comprise the NG interface standardized by 3GPP. In some exemplary embodiments, core network interface 1450 can comprise one or more interfaces to one or more AMFs, SMFs, SGWs, MMEs, SGSNs, GGSNs, and other physical devices that comprise functionality found in GERAN, UTRAN, EPC, 5GC, and CDMA2000 core networks that are known to persons of ordinary skill in the art. In some embodiments, these one or more interfaces may be multiplexed together on a single physical interface. In some embodiments, lower layers of core network interface 1450 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art.

In some embodiments, network node 1400 can include hardware and/or software that configures and/or facilitates network node 1400 to communicate with other network nodes in a RAN (also referred to as a "wireless network"), such as with other eNBs, gNBs, ng-eNBs, en-gNBs, IAB nodes, etc. Such hardware and/or software can be part of radio network interface 1440 and/or core network interface 1450, or it can be a separate functional unit (not shown). For example, such hardware and/or software can configure and/or facilitate network node 1400 to communicate with other RAN nodes via the X2 or Xn interfaces, as standardized by 3GPP.

OA&M interface 1460 can comprise transmitters, receivers, and other circuitry that enables network node 1400 to communicate with external networks, computers, databases, and the like for purposes of operations, administration, and maintenance of network node 1400 or other network equipment operably connected thereto. Lower layers of OA&M interface 1460 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art. Moreover, in some embodiments, one or more of radio network interface 1440, core network interface 1450, and OA&M interface 1460 may be multiplexed together on a single physical interface, such as the examples listed above.

Figure 15:
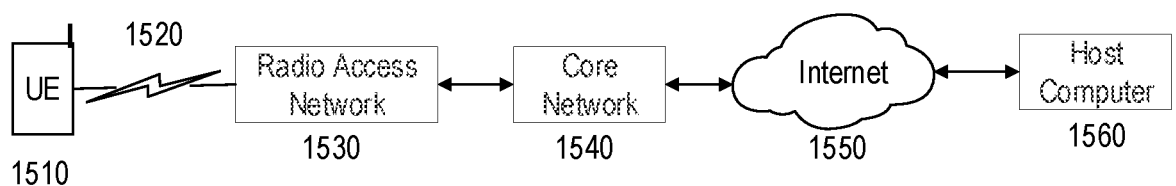
FIG. 15 is a block diagram of an exemplary network configured to provide over-the-top (OTT) data services between a host computer and a UE, according to various exemplary embodiments of the present disclosure.

FIG. 15 is a block diagram of an exemplary communication network configured to provide over-the-top (OTT) data services between a host computer and a user equipment (UE), according to various exemplary embodiments of the present disclosure. UE 1510 can communicate with radio access network (RAN, also referred to as "wireless network") 1530 over radio interface 1520, which can be based on protocols described above including, e.g., LTE, LTE-A, and 5G/NR. For example, UE 1510 can be configured and/or arranged as shown in other figures discussed above.

RAN 1530 can include one or more terrestrial network nodes (e.g., base stations, eNBs, gNBs, controllers, etc.) operable in licensed spectrum bands, as well one or more network nodes operable in unlicensed spectrum (using, e.g., LAA or NR-U technology), such as a 2.4-GHz band and/or a 5-GHz band. In such cases, the network nodes comprising RAN 1530 can cooperatively operate using licensed and unlicensed spectrum. In some embodiments, RAN 1530 can include, or be capable of communication with, one or more satellites comprising a satellite access network.

RAN 1530 can further communicate with core network 1540 according to various protocols and interfaces described above. For example, one or more apparatus (e.g., base stations, eNBs, gNBs, etc.) comprising RAN 1530 can communicate to core network 1540 via core network interface 1550 described above. In some exemplary embodiments, RAN 1530 and core network 1540 can be configured and/or arranged as shown in other figures discussed above. For example, eNBs comprising an E-UTRAN 1530 can communicate with an EPC core network 1540 via an S1 interface. As another example, gNBs and ng-eNBs comprising an NG-RAN 1530 can communicate with a 5GC core network 1530 via an NG interface.

Core network 1540 can further communicate with an external packet data network, illustrated in FIG. 15 as Internet 1550, according to various protocols and interfaces known to persons of ordinary skill in the art. Many other devices and/or networks can also connect to and communicate via Internet 1550, such as exemplary host computer 1560. In some exemplary embodiments, host computer 1560 can communicate with UE 1510 using Internet 1550, core network 1540, and RAN 1530 as intermediaries. Host computer 1560 can be a server (e.g., an application server) under ownership and/or control of a service provider. Host computer 1560 can be operated by the OTT service provider or by another entity on the service provider's behalf.

For example, host computer 1560 can provide an over-the-top (OTT) packet data service to UE 1510 using facilities of core network 1540 and RAN 1530, which can be unaware of the routing of an outgoing/incoming communication to/from host computer 1560. Similarly, host computer 1560 can be unaware of routing of a transmission from the host computer to the UE, e.g., the routing of the transmission through RAN 1530. Various OTT services can be provided using the exemplary configuration shown in FIG. 15 including, e.g., streaming (unidirectional) audio and/or video from host computer to UE, interactive (bidirectional) audio and/or video between host computer and UE, interactive messaging or social communication, interactive virtual or augmented reality, etc.

The exemplary network shown in FIG. 15 can also include measurement procedures and/or sensors that monitor network performance metrics including data rate, latency and other factors that are improved by exemplary embodiments disclosed herein. The exemplary network can also include functionality for reconfiguring the link between the endpoints (e.g., host computer and UE) in response to variations in the measurement results. Such procedures and functionalities are known and practiced; if the network hides or abstracts the radio interface from the OTT service provider, measurements can be facilitated by proprietary signaling between the UE and the host computer.

The exemplary embodiments described herein provide novel techniques for a managing a bidirectional measurement between UE and a network node on two links (e.g., DL and UL) comprising at least one beamformed link. The beamforming may be performed at any one or more of the UE receiver, the UE transmitter, the network node transmitter, and the network node receiver. Such bidirectional measurements with asymmetric links can facilitate more accurate distance or location estimates and/or reduced UE complexity, as described above. Such advantages can be very important in certain applications, such as high-precision/high-accuracy positioning and/or low-complexity positioning. When used in NR UEs (e.g., UE 1510) and gNBs (e.g., gNBs comprising RAN 1530), exemplary embodiments described herein can provide various improvements, benefits, and/or advantages that facilitate the use of location-based OTT services. As a consequence, this improves the performance of these services as experienced by OTT service providers and end-users, including more precise delivery of services with lower latency without excessive UE power consumption or other reductions in user experience.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various exemplary embodiments can be used together with one another, as well as interchangeably therewith, as should be understood by those having ordinary skill in the art.

The term unit, as used herein, can have conventional meaning in the field of electronics, electrical devices and/or electronic devices and can include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification and drawings, can be used synonymously in certain instances (e.g., "data" and "information"). It should be understood, that although these terms (and/or other terms that can be synonymous to one another) can be used synonymously herein, there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

Embodiments of the techniques and apparatus described herein also include, but are not limited to, the following enumerated examples:

1. A method for managing bidirectional measurements of signals on an uplink/downlink pair between a user equipment (UE) and a network node, the method comprising:
   transmitting a signal associated with one of the bidirectional measurements on one link of the uplink/downlink pair during a first time resource;
   receiving a signal associated with the other of the bidirectional measurements on the other of the uplink/downlink pair during a second time resource that is different from the first time resource,
   wherein at least one of the UE and the network node employs antenna beamforming for transmitting or receiving signals used for the measurements on at least one of the uplink and the downlink.

2. The method of embodiment 1, further comprising performing one of the bidirectional measurements on the received signal.

3. The method of embodiment 2, further comprising compensating at least one of the bidirectional measurements based on a difference between the first time resource and the second time resource.

4. The method of any of embodiment 3, further comprising determining the position of the UE based on the compensated bidirectional measurements.

5. A method for managing bidirectional measurements of signals on an asymmetric uplink/downlink pair between one or more user equipment (UE) and one or more network nodes, the method comprising:
   transmitting a signal associated with one of the bidirectional measurements on one link of the uplink/downlink pair between a first UE and a first network node; and
   receiving a signal associated with the other of the bidirectional measurements on the other of the uplink/downlink pair between a second UE and a second network node, wherein one of the following two conditions apply:
      the first UE is the same as the second UE, and the first network node is different from the second network node; or
      the first UE is different from the second UE, and the first network node is the same as the second network node.

6. The method of embodiment 5, further comprising performing one of the bidirectional measurements on the received signal.

7. The method of embodiment 6, further comprising compensating at least one of the bidirectional measurements based on a difference between the respective propagation distances of the uplink/downlink pair.

8. The method of any of embodiment 7, further comprising determining the position of the UE based on the compensated bidirectional measurements.

9. A user equipment (UE) configured to manage bidirectional measurements of signals on an uplink/downlink pair with one or more network nodes, the UE comprising:
   communication circuitry configured to communicate with the network nodes; and processing circuitry operatively associated with the communication circuitry and configured to perform operations corresponding to the methods of any of exemplary embodiments 1-8.

27. A radio network node configured to manage bidirectional measurements of signals on an uplink/downlink pair with one or more user equipment (UE), the network node comprising:
communication circuitry configured to communicate with the UEs; and
processing circuitry operatively associated with the communication circuitry and configured to perform operations corresponding to the methods of any of embodiments 1-8.

28. A non-transitory, computer-readable medium storing computer-executable instructions that, when executed by at least one processor of a user equipment (UE), configure the UE to perform operations corresponding to the methods of any of exemplary embodiments 1-8.

29. A non-transitory, computer-readable medium storing computer-executable instructions that, when executed by at least one processor comprising a radio network node, configure the radio network node to perform operations corresponding to the methods of any of exemplary embodiments 1-8.

The invention claimed is:

1. A method for managing a bidirectional measurement for an uplink/downlink, UL/DL, pair of links between one or more first nodes and a plurality of second nodes in a wireless network, the method comprising:
obtaining a transmit timing of a first signal on a first link of the UL/DL pair during a first time resource, the first signal being a beamformed transmission from a first node of the one or more first nodes;
obtaining a receive timing of a second signal on a second link of the UL/DL pair during a second time resource, the second signal being a beamformed transmission from a non-serving cell associated with one of the plurality of second nodes;
at least one of the transmit timing and the receive timing being defined with respect to a reference time resource, the reference time resource being the second time resource; and
determining the bidirectional measurement based on the transmit timing and the receive timing, and at least one of:
the first and the second links being between one of the one or more first nodes and two respective second nodes of the plurality of second nodes;
at least one of the first link and the second link being associated with a non-serving carrier frequency, the first time resource and the second time resource being different; and
at least one of the first link and the second link being managed via one or more beams, the first time resource and the second time resource being different.

2. The method of claim 1, wherein the first and the second links are between the one of the one or more first nodes and the two respective second nodes of the plurality of second nodes, and wherein the first time resource and the second time resource are different.

3. The method of claim 1, wherein one of more of:
obtaining the transmit timing comprises selecting the transmit timing from a plurality of transmit timing measurements; and obtaining the receive timing comprises selecting the receive timing from a plurality of receive timing measurements.

4. The method of claim 1, wherein:
determining the bidirectional measurement further comprises applying a compensation to at least one of the transmit timing, the receive timing, and the bidirectional measurement; and
the compensation is based on one or more of:
a timing difference due to transmit beamforming on at least one of the first link and the second link, wherein transmissions of the first signal via different transmit beams are associated with different time resources,
a timing difference due to receive beamforming on at least one of the first and the second links, wherein receiving of the second signal via different receive beams is associated with different time resources, and
a difference between respective propagation distances or propagation times of the first link and the second link.

5. The method of claim 4, further comprising sending the bidirectional measurement to another node, wherein the compensation is applied before or after sending the bidirectional measurement to the another node.

6. The method of claim 5, where the bidirectional measurement is sent to the another node together with an indication of one of:
whether compensation was applied to the bidirectional measurement;
an amount of compensation that was applied to the bidirectional measurement; and
an amount of compensation needed for the bidirectional measurement.

7. The method of claim 4, wherein determining the bidirectional measurement comprises determining the compensation autonomously or based on information received from another node.

8. The method of claim 4, wherein one of more of:
obtaining the transmit timing comprises receiving, from another node in the wireless network, the transmit timing and an indication of one of:
whether compensation was applied to the transmit timing,
an amount of compensation that was applied to the transmit timing, or
an amount of compensation needed for the transmit timing; and
obtaining the receive timing comprises receiving, from another node in the wireless network, the receive timing and an indication of one of:
whether compensation was applied to the receive timing,
an amount of compensation that was applied to the receive timing, and
an amount of compensation needed for the receive timing.

9. The method of claim 1, further comprising determining a position of a user equipment, UE, based on the bidirectional measurement.

10. The method of claim 1, wherein:
the method is performed by a user equipment, UE;
obtaining the transmit timing of the first signal comprises:
receiving, from a first radio network node, a message controlling the transmit timing of the first signal, and
obtaining the transmit timing of the first signal based on the received message;

obtaining the receive timing of the second signal comprises measuring the receive timing on the second signal, wherein the second signal is received from the first radio network node or a second network node; and the method further comprises transmitting the first signal based on the obtained transmit timing.

11. The method of claim 10, wherein:
the first link is an UL between the UE and the first radio network node, wherein the first radio network node is a serving node for the UE;
the second link is a DL between a second radio network node and the UE, wherein the second radio network node is a non-serving node for the UE; and
the second signal is received from the second radio network node.

12. The method of claim 10, wherein:
the first and the second time resources are different subframes or different radio frames;
the second signal is received, from the first radio network node, during the second time resource using a second beam; and
the first signal is transmitted during the first time resource using one or more first beams that are different from the second beam.

13. The method of claim 1, wherein:
the first and the second links are between the one of the one or more first nodes and the two respective second nodes of the plurality of second nodes;
the first link is an UL between a first user equipment, UE, and a first radio network node; and
the second link is a DL between the first radio network node and a second UE.

14. The method of claim 13, wherein:
the method is performed by the first radio network node or a positioning node in the wireless network;
obtaining the transmit timing of the first signal comprises measuring the transmit timing on the first signal, received from the first UE; and
obtaining the receive timing of the second signal comprises:
transmitting the second signal, and
receiving a measurement of the receive timing from the second UE.

15. The method of claim 13, wherein:
the method is performed by a location management function, LMF, coupled to the wireless network;
obtaining the transmit timing of the first signal comprises receiving a measurement of the transmit timing from the first radio network node; and
obtaining the receive timing of the second signal comprises receiving a measurement of the receive timing from the second UE or the first radio network node.

16. A user equipment, UE configured to manage a bidirectional measurement for an uplink/downlink, UL/DL, pair of links in a wireless network, the UE comprising:
radio transceiver circuitry configured to communicate with a plurality of radio network nodes in the wireless network;
processing circuitry operatively coupled to the radio transceiver circuitry, the processing circuitry and the radio transceiver circuitry being configured to:
obtain a transmit timing of a first signal on a first link of the UL/DL pair during a first time resource, the first signal being a beamformed transmission from a first node of the plurality of radio network nodes;
obtain a receive timing of a second signal on a second link of the UL/DL pair during a second time resource, the second signal being a beamformed transmission from a non-serving cell associated with a second node of the plurality of radio network nodes;
at least one of the transmit timing and the receive timing being defined with respect to a reference time resource, the reference time resource being the second time resource; and
determine the bidirectional measurement based on the transmit timing and the receive timing, and at least one of:
the first and the second links being between the UE and two respective other nodes of the plurality of radio network nodes;
at least one of the first link and the second link being associated with a non-serving carrier frequency, the first time resource and the second time resource being different; and
at least one of the first link and the second link being managed via one or more beams, the first time resource and the second time resource being different.

17. A radio network node configured to manage a bidirectional measurement for an uplink/downlink, UL/DL, pair of links in a wireless network, the radio network node comprising:
radio network interface circuitry configured to communicate with one or more radio user equipment, UE, in the wireless network;
processing circuitry operatively coupled to the radio network interface circuitry, the processing circuitry and the radio network interface circuitry being configured to:
obtain a transmit timing of a first signal on a first link of the UL/DL pair during a first time resource, the first signal being a beamformed transmission from a first node;
obtain a receive timing of a second signal on a second link of the UL/DL pair during a second time resource, the second signal being a beamformed transmission from a non-serving cell associated with a second node of a plurality of second nodes;
at least one of the transmit timing and the receive timing being defined with respect to a reference time resource, the reference time resource being the second time resource; and
determine the bidirectional measurement based on the transmit timing and the receive timing, and at least one of:
the first and the second links are between the first node and two other nodes of the plurality of second nodes;
at least one of the first link and the second link are associated with a non-serving carrier frequency, the first time resource and the second time resource are different; and
at least one of the first link and the second link are managed via one or more beams, the first time resource and the second time resource are different.

18. A location management function, LMF, configured to manage a bidirectional measurement for an uplink/downlink, UL/DL, pair of links in a wireless network, the LMF comprising processing circuitry configured to:

obtain a transmit timing of a first signal on a first link of the UL/DL pair during a first time resource, the first signal being a beamformed transmission from a first node;

obtain a receive timing of a second signal on a second link of the UL/DL pair during a second time resource, the second signal being a beamformed transmission from a non-serving cell associated with a second node of a plurality of second nodes;

at least one of the transmit timing and the receive timing being defined with respect to a reference time resource, the reference time resource being the second time resource; and determine the bidirectional measurement based on the transmit timing and the receive timing, and at least one of:

the first and the second links being between the first node and two other nodes of the plurality of second nodes;

at least one of the first link and the second link being associated with a non-serving carrier frequency, the first time resource and the second time resource are being different; and at least one of the first link and the second link being managed via one or more beams, the first time resource and the second time resource are being different.

* * * * *